United States Patent
Benhimane et al.

(10) Patent No.: US 9,525,862 B2
(45) Date of Patent: Dec. 20, 2016

(54) METHOD FOR ESTIMATING A CAMERA MOTION AND FOR DETERMINING A THREE-DIMENSIONAL MODEL OF A REAL ENVIRONMENT

(75) Inventors: Selim Benhimane, Munich (DE); Sebastian Lieberknecht, Munich (DE); Andrea Huber, Munich (DE)

(73) Assignee: Metaio GmbH, Munich (DE)

( * ) Notice: Subject to any disclaimer, the term of this patent is extended or adjusted under 35 U.S.C. 154(b) by 360 days.

(21) Appl. No.: 14/240,995

(22) PCT Filed: Aug. 31, 2011

(86) PCT No.: PCT/EP2011/065007
§ 371 (c)(1),
(2), (4) Date: Jun. 10, 2014

(87) PCT Pub. No.: WO2013/029675
PCT Pub. Date: Mar. 7, 2013

(65) Prior Publication Data
US 2014/0293016 A1 Oct. 2, 2014

(51) Int. Cl.
*H04N 13/02* (2006.01)
*G06T 7/00* (2006.01)
(Continued)

(52) U.S. Cl.
CPC ......... *H04N 13/0221* (2013.01); *G06T 7/0028* (2013.01); *G06T 7/2033* (2013.01);
(Continued)

(58) Field of Classification Search
None
See application file for complete search history.

(56) References Cited

U.S. PATENT DOCUMENTS 7,023,536 B2   4/2006   Zhang et al.
7,038,846 B2   5/2006   Mandella
(Continued)

FOREIGN PATENT DOCUMENTS

CN   101833791 A   9/2010

OTHER PUBLICATIONS

A. J. Davison. 2003. Real-Time Simultaneous Localisation and Mapping with a Single Camera. In Proceedings of the Ninth IEEE International Conference on Computer Vision—vol. 2 (ICCV '03), vol. 2, pp. 1403-.

(Continued)

*Primary Examiner* — Sath V Perungavoor
*Assistant Examiner* — Janese Duley
(74) *Attorney, Agent, or Firm* — Blank Rome LLP

(57) ABSTRACT

A method for estimating a camera motion and for determining a three-dimensional model of an environment is provided that includes the steps of: providing intrinsic parameters of a camera; providing a set of reference two-dimensional imaged points captured by the camera at a first camera pose and reference depth samples; determining a three-dimensional model of the environment; providing a set of current two-dimensional imaged points captured by the camera at a second camera pose and current depth samples associated to the set of current two-dimensional imaged points and determining a current three-dimensional model; estimating a camera motion between the first camera pose and the second camera pose; determining a similarity measure between the three-dimensional model and the current three-dimensional model, and if it is determined that the similarity measure meets a first condition, updating the three-dimensional model of the environment and adding the set of current two-dimensional imaged points to the set of reference two-dimensional imaged points.

21 Claims, 13 Drawing Sheets

Exemplary embodiment of standard approach

(51) Int. Cl.
*G06T 7/20* (2006.01)
*G06T 17/00* (2006.01)

(52) U.S. Cl.
CPC .......... *G06T 17/00* (2013.01); *G06T 2200/08* (2013.01); *G06T 2207/10024* (2013.01); *G06T 2207/10028* (2013.01); *G06T 2207/30244* (2013.01)

(56) References Cited

U.S. PATENT DOCUMENTS

| | | | |
|---|---|---|---|
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl |
| 7,268,956 | B2 | 9/2007 | Mandella |
| 7,474,809 | B2 | 1/2009 | Carl et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 2005/0168437 | A1 | 8/2005 | Carl et al. |
| 2008/0310757 | A1* | 12/2008 | Wolberg ............ G06K 9/00208 382/285 |
| 2010/0232727 | A1 | 9/2010 | Engedal |
| 2011/0227915 | A1 | 9/2011 | Mandella et al. |
| 2012/0038549 | A1 | 2/2012 | Mandella et al. |
| 2013/0194418 | A1 | 8/2013 | Gonzalez-Banos et al. |

OTHER PUBLICATIONS

R.A. Newcombe et al. 2010. Live dense reconstruction with a single moving camera. IEEE Conference on Computer Vision and pattern Recognition (CVPR), 2010.

G. Klein et al. 2007. Parallel Tracking and Mapping for Small AR Workspaces. In Proceedings of the 2007 6th IEEE and ACM International Symposium on Mixed and Augmented Reality (ISMAR '07), pp. 1-10.

V. Castaneda et al. 2011. Slam combining tof and high-resolution cameras. In Proceedings of the 2011 IEEE Workshop on Applications of Computer Vision (WACV '11), pp. 672-678.

H. Strasdat et al. 2010. Real-time Monocular SLAM: Why Filter?. In 2010 IEEE International Conference on Robotics and Automation (ICRA), Anchorage, Alaska, USA, pp. 2657-2664.

P. Henry et al. 2010. RGB-D Mapping: Using depth cameras for dense 3d Modeling of indoor environments. In Proc. of 2010 International Symposium on Experimental Robotics (ISER'10).

G. Turk et al. 1994. Zippered polygon meshes from range images. In Proceedings of the 21st annual conference on Computer graphics and interactive techniques (SIGGRAPH '94). ACM, New York, NY, USA, pp. 311-318.

B. D. Lucas et al. 1981. An iterative image registration technique with an application to stereo vision. In Proceedings of the 7th international joint conference on Artificial intelligence—vol. 2 (IJCAI'81), vol. 2., pp. 674-679.

S. Umeyama. 1991. Least-Squares Estimation of Transformation Parameters Between Two Point Patterns. IEEE Trans. Pattern Anal. Mach. Intell. 13, 4 ,pp. 376-380.

P. J. Besl et al. 1992. A Method for Registration of 3-D Shapes. IEEE Trans. Pattern Anal. Mach. Intell. 14, 2 (Feb. 1992), pp. 239-256.

Z. Zhang. 1994. Iterative point matching for registration of freeform curves and surfaces. Int. J. Comput. Vision 13, 2 (Oct. 1994),pp. 119-152.

B. Curless et al. 1996. A volumetric method for building complex models from range images. In Proceedings of the 23rd annual conference on Computer graphics and interactive techniques (SIGGRAPH '96). ACM, New York, NY, USA, pp. 303-312.

D. G. Lowe. 2004. Distinctive Image Features from Scale-Invariant Keypoints. Int. J. Comput. Vision 60, 2, pp. 91-110.

D. V. Johnston, Learning Depth in Lightfield Images, CS229 Machine Learning Autumn 2005, Stanford University, 2005, http://www.stanford.edu/class/cs229/proj2005/Johnston-LearningDepthInLightfieldImages.pdf.

Kakiuchi et al. "Creating Household Environment Map for Environment Manipulation Using Color Range Sensors on Environment and Robot", 2011 IEEE International Conference on Robotics and Automation (ICRA), May 9, 2011, pp. 305-310.

\* cited by examiner

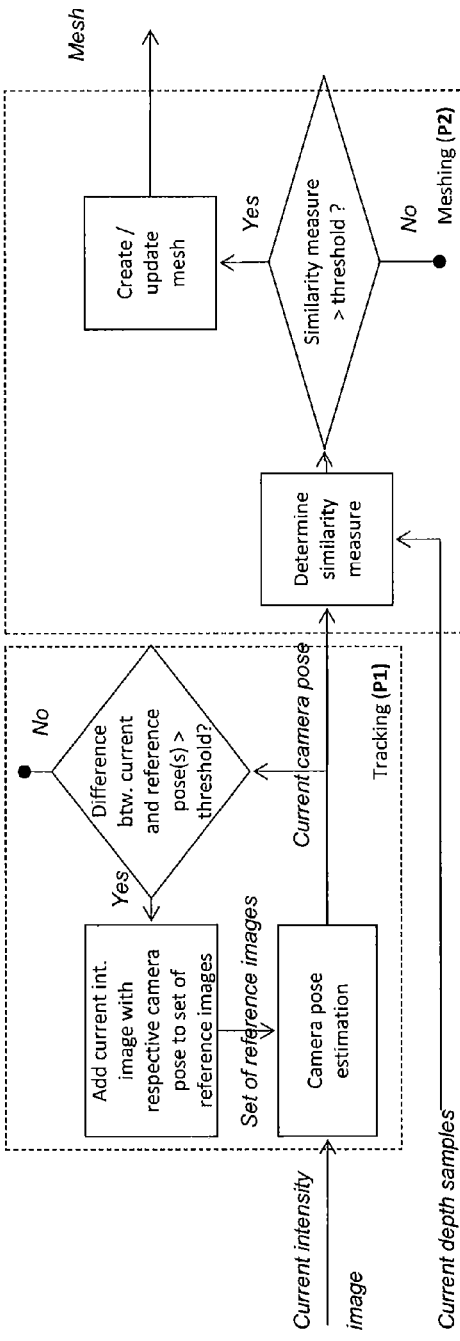
Fig. 1a Exemplary embodiment of standard approach
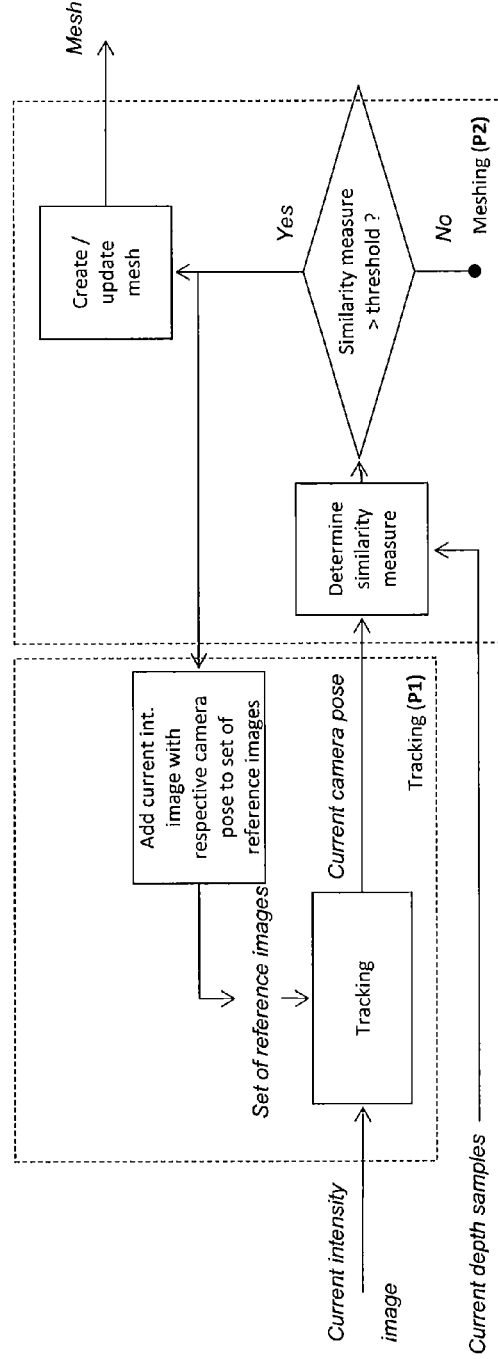
Fig. 1b Overview on exemplary embodiment of invention

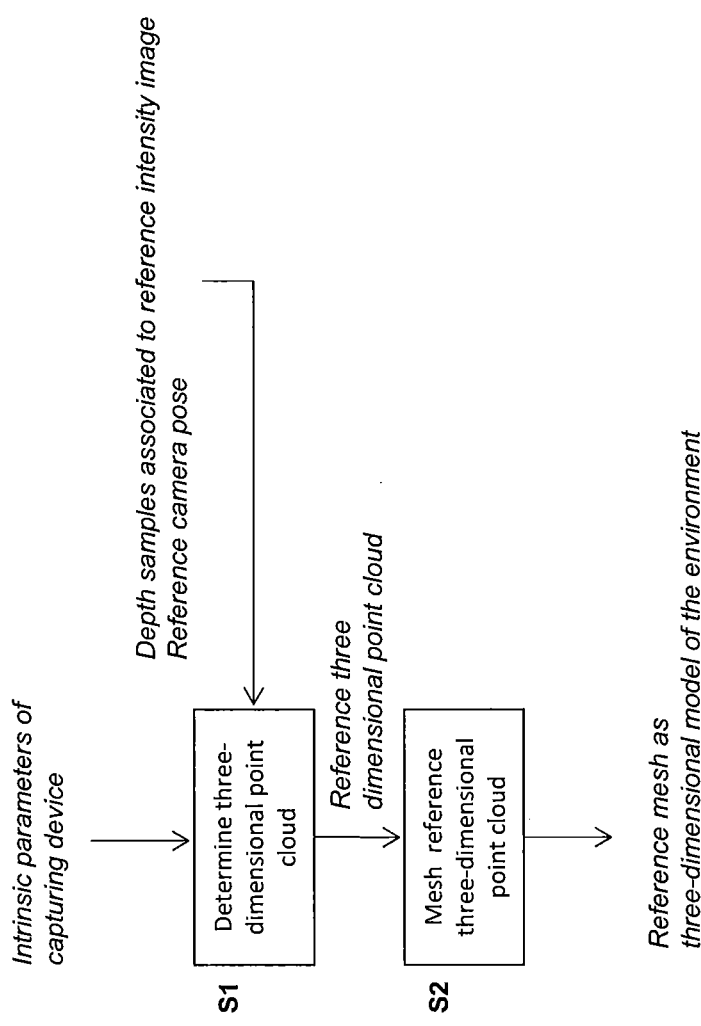
Fig. 2a Creation of initial three-dimensional model

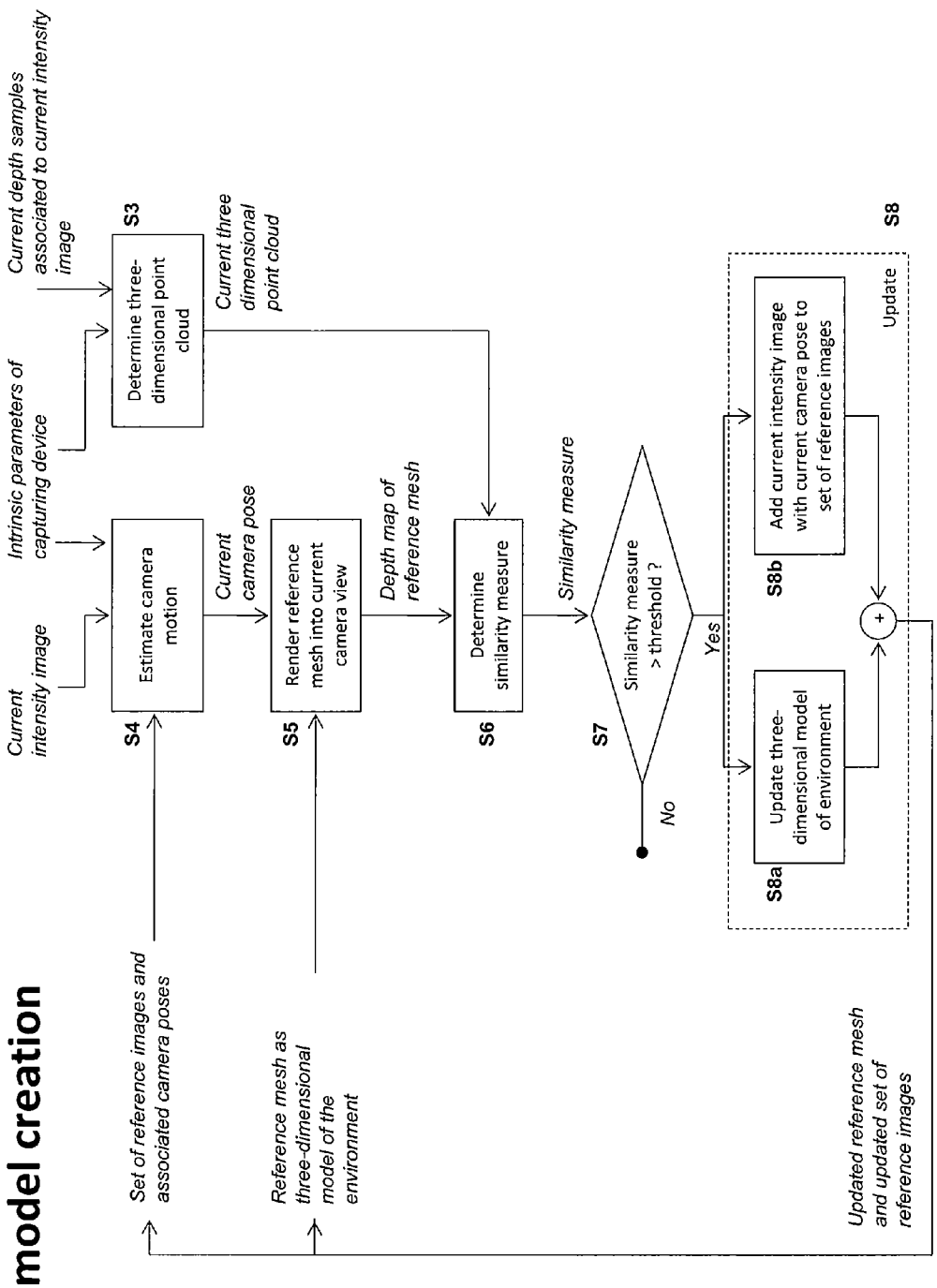

Fig. 3 Exemplary embodiment of update of reference model
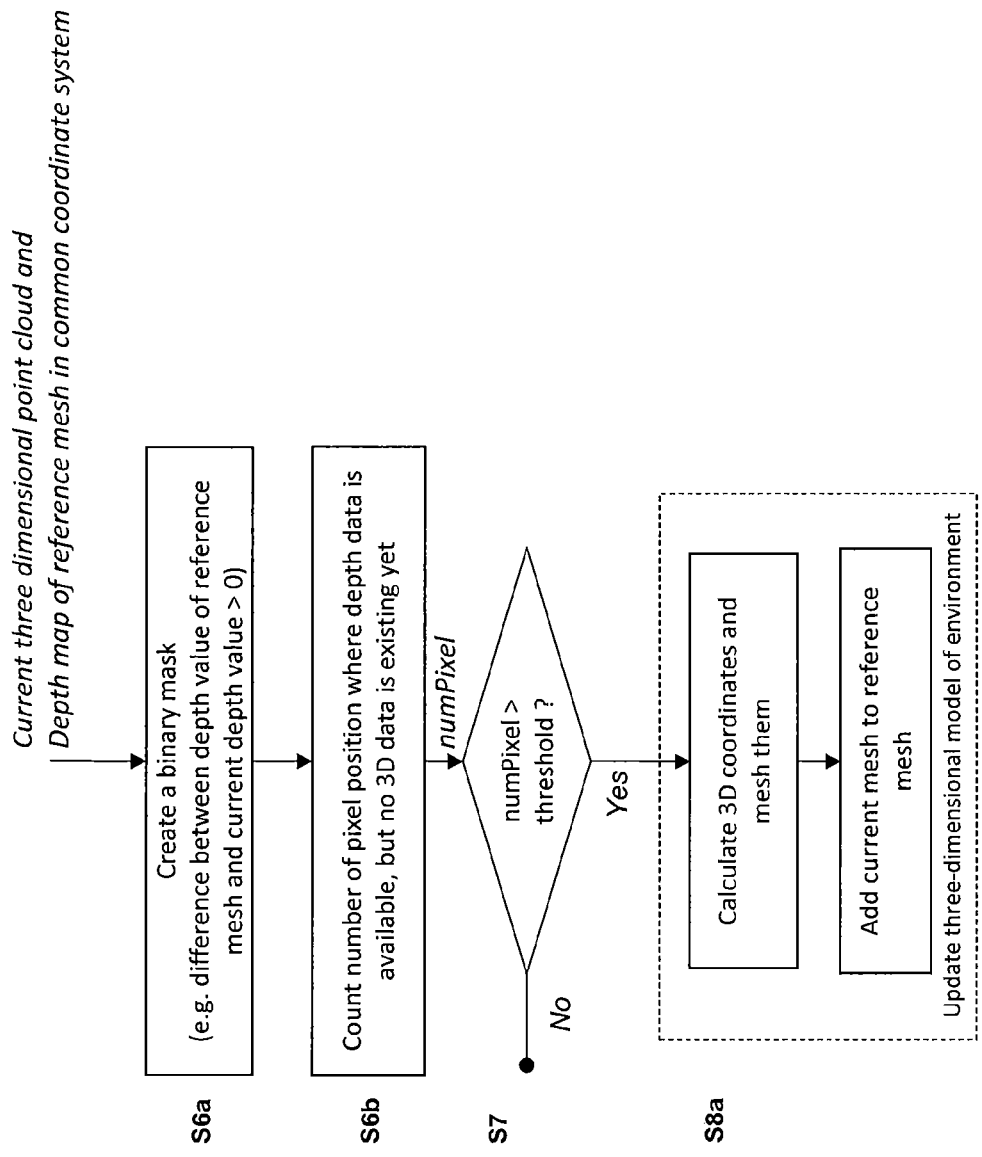

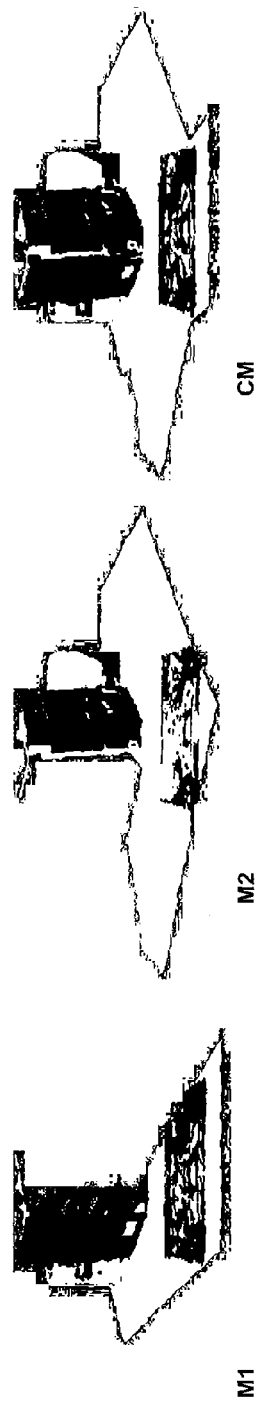
Fig. 4 Alignment of two meshes in common coordinate system
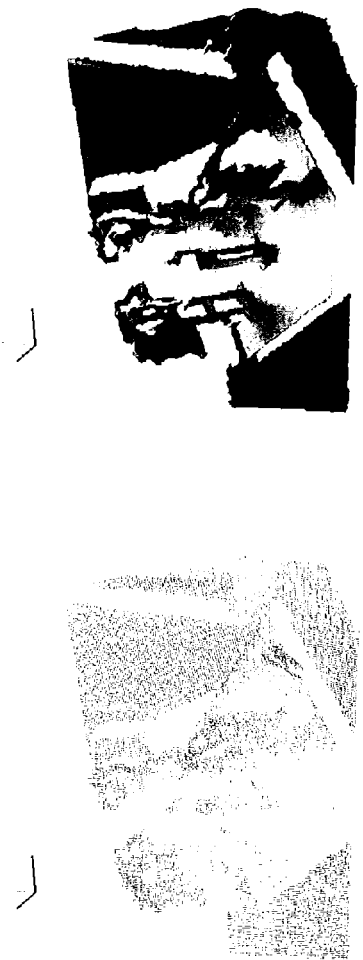
Fig. 5 Input 3D point cloud captured (left) and its corresponding textured mesh (right)

Fig. 6 Refinement of three-dimensional point based on camera motion
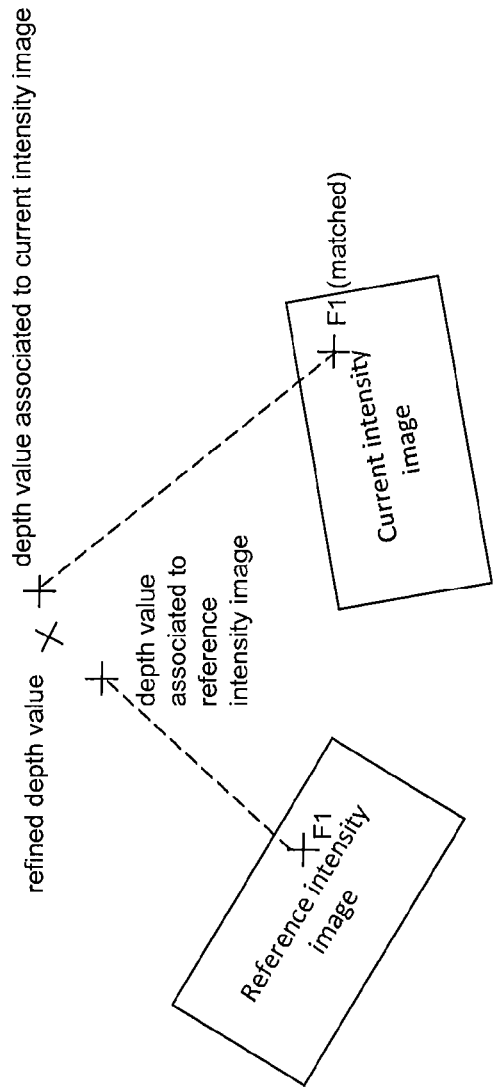

Fig. 7 Exemplary evaluation results with respect to tracking

|  |  | rotation [deg] | | translation [mm] | | images tracked |
|---|---|---|---|---|---|---|
|  |  | μ | σ | μ | σ | |
| seq01 | proposed | 2.45 | 1.30 | 10.71 | 5.50 | 300/300 |
|  | PTAM 05 | 7.04 | 3.72 | 94.55 | 42.35 | 282/300 |
|  | PTAM 10 | 2.53 | 1.25 | 15.95 | 8.73 | 291/300 |
|  | PTAM 15 | 1.37 | 0.85 | 17.77 | 9.97 | 286/300 |
|  | PTAM 20 | 3.75 | 2.01 | 28.36 | 17.18 | 281/300 |
|  | PTAM 25 | 1.85 | 1.02 | 26.69 | 11.44 | 276/300 |
| seq02 | proposed | 4.03 | 2.00 | 6.85 | 2.82 | 300/300 |
|  | PTAM 05 | 15.53 | 10.50 | 44.02 | 46.31 | 120/300 |
|  | PTAM 10 | 3.05 | 2.56 | 39.62 | 41.50 | 175/300 |
|  | PTAM 15 | – | – | – | – | 0/300 |
|  | PTAM 20 | 1.88 | 0.83 | 11.18 | 6.58 | 281/300 |
|  | PTAM 25 | 13.78 | 5.06 | 162.95 | 78.85 | 243/300 |
| seq03 | proposed | 5.76 | 3.36 | 21.49 | 8.93 | 300/300 |
|  | PTAM 05 | 7.17 | 5.28 | 38.60 | 15.99 | 58/300 |
|  | PTAM 10 | 19.36 | 12.09 | 18.69 | 8.05 | 69/300 |
|  | PTAM 15 | 6.59 | 3.24 | 17.31 | 8.11 | 225/300 |
|  | PTAM 20 | 6.86 | 3.33 | 18.08 | 9.52 | 212/300 |
|  | PTAM 25 | 7.95 | 3.84 | 18.77 | 8.45 | 276/300 |
| seq04 | proposed | 2.62 | 1.47 | 13.18 | 6.37 | 300/300 |
|  | PTAM 05 | – | – | – | – | 0/300 |
|  | PTAM 10 | 13.62 | 9.43 | 97.83 | 58.16 | 142/300 |
|  | PTAM 15 | 2.05 | 1.19 | 35.50 | 31.09 | 162/300 |
|  | PTAM 20 | 2.45 | 1.22 | 17.36 | 13.55 | 150/300 |
|  | PTAM 25 | 2.43 | 1.02 | 18.81 | 12.73 | 276/300 |

Figure 9
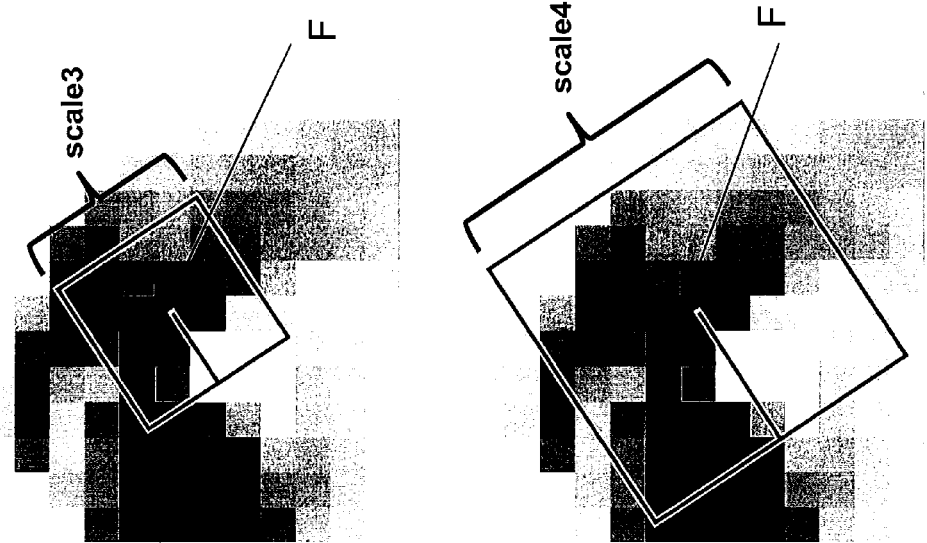
Example for the scale of a feature descriptor, e.g. SIFT
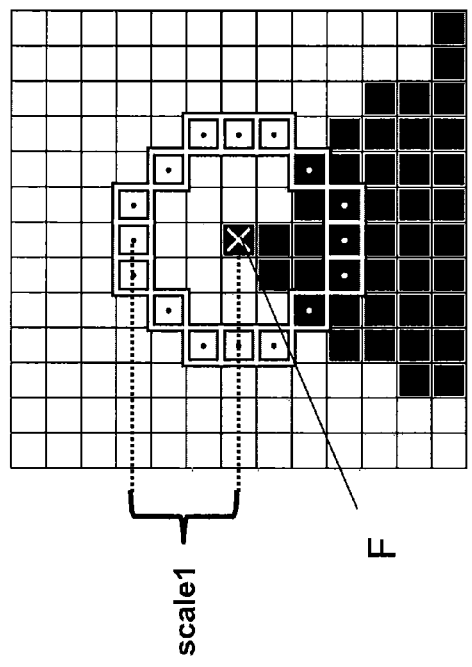
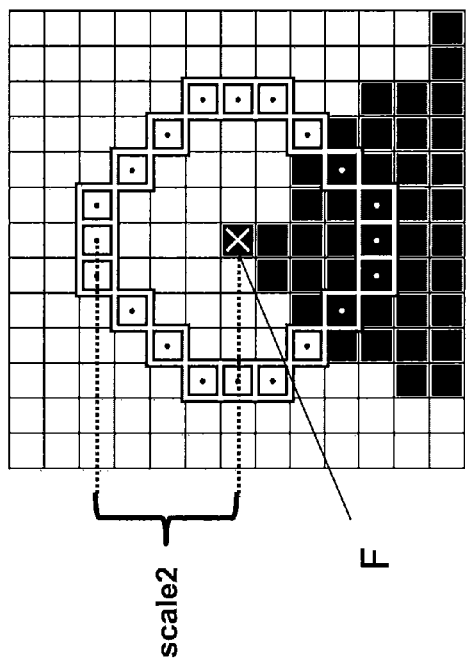
Example for the scale of a feature (detector), e.g. FAST

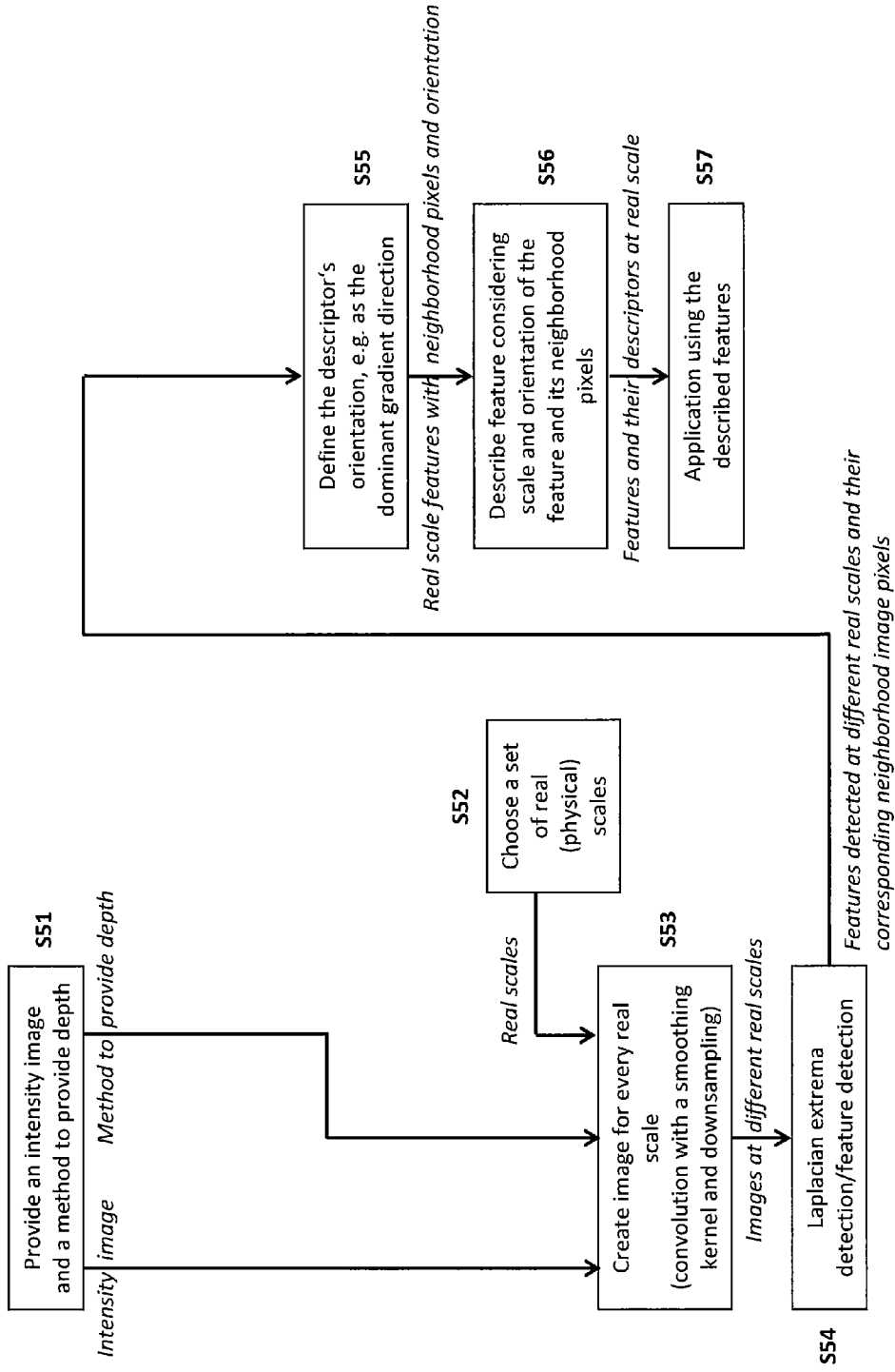

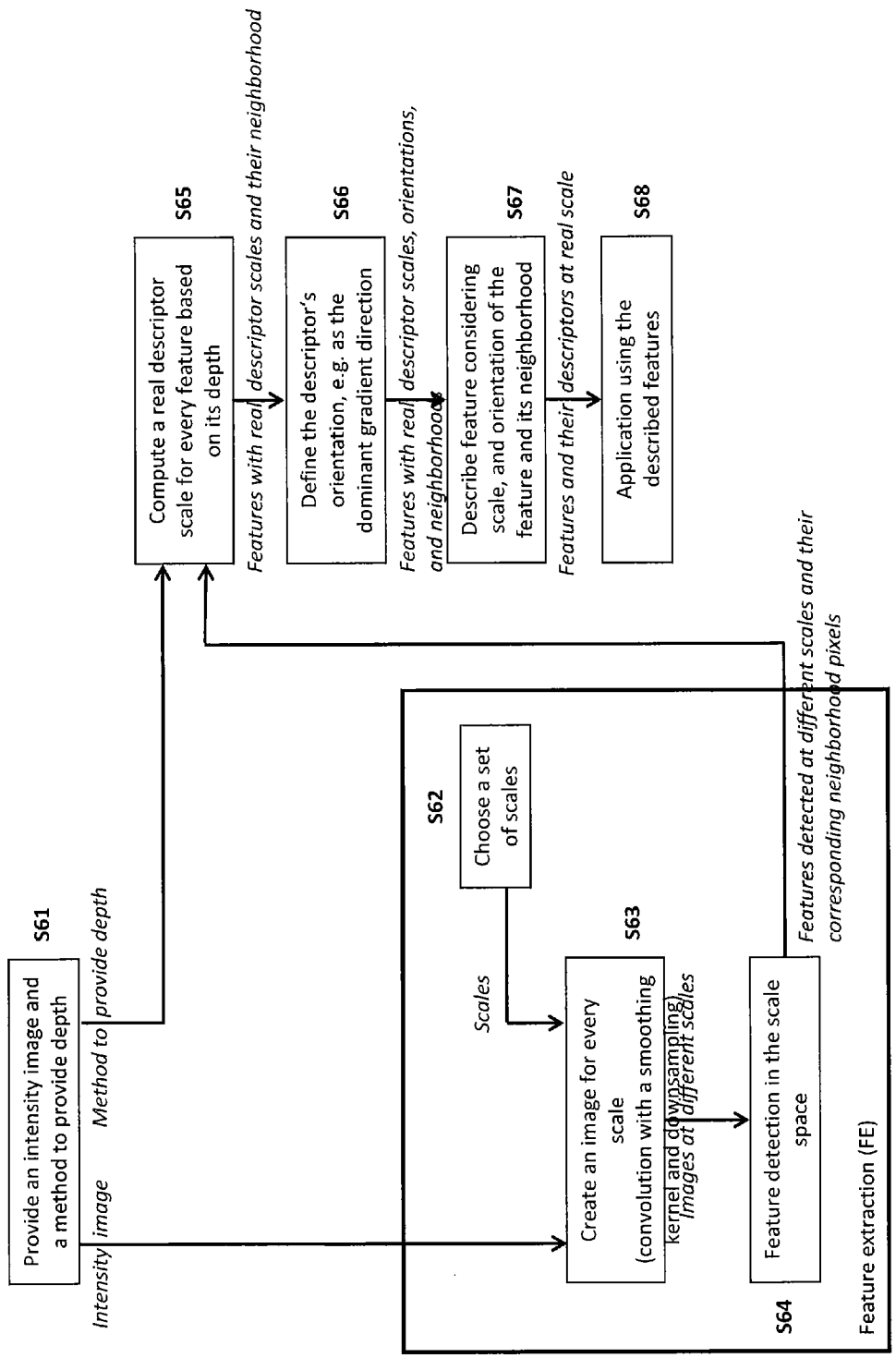
Figure 10b: Real scale feature description

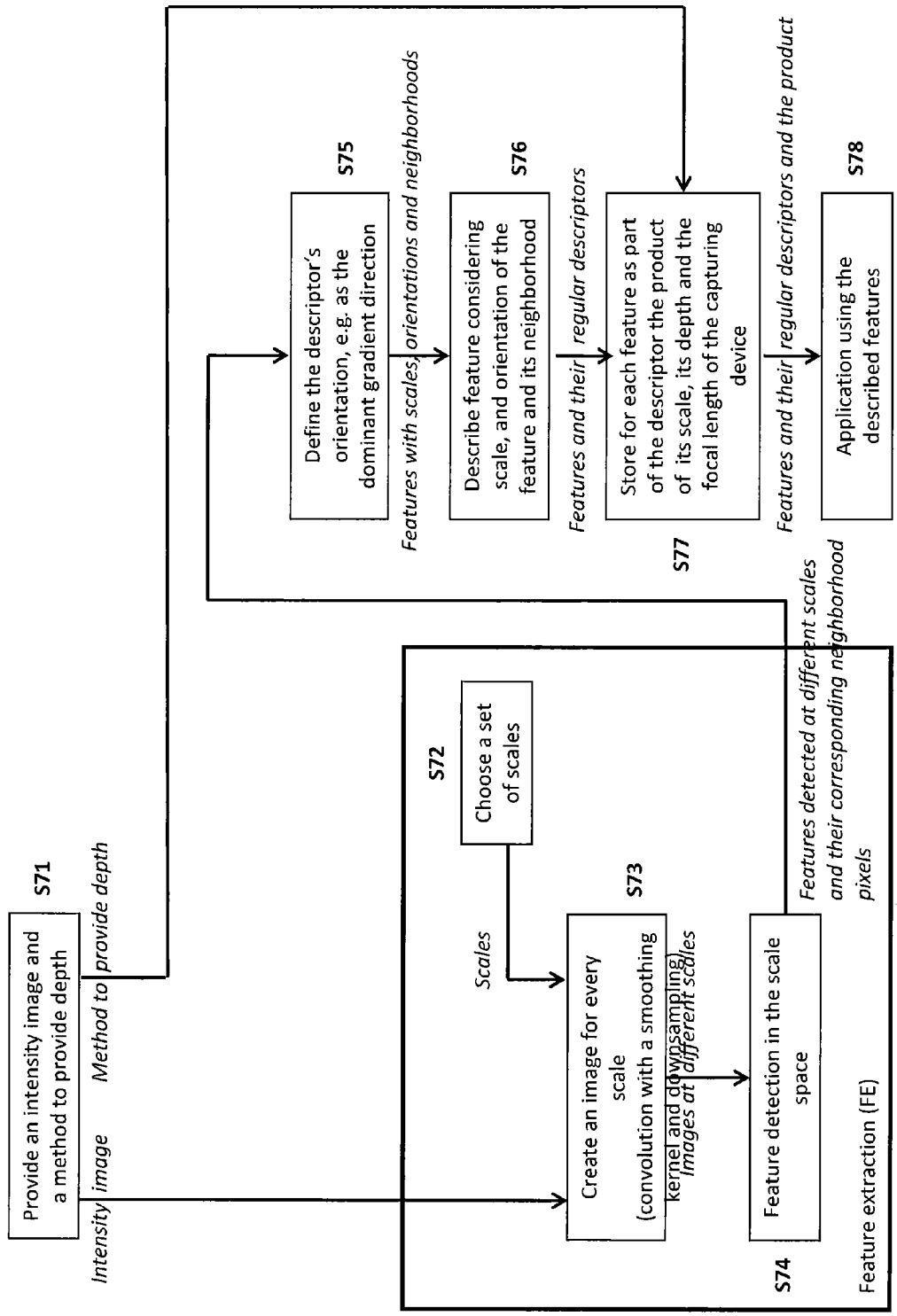
Figure 10c: Scale-invariant real-scale-aware feature description

METHOD FOR ESTIMATING A CAMERA MOTION AND FOR DETERMINING A THREE-DIMENSIONAL MODEL OF A REAL ENVIRONMENT

This application is entitled to the benefit of, and incorporates by reference essential subject matter disclosed in PCT Application No. PCT/EP2011/065007 filed on Aug. 31, 2011.

BACKGROUND OF THE INVENTION

1. Technical Field

The invention is directed to a method for estimating a camera motion and for determining a three-dimensional model of an environment.

2. Background Information

Visual real-time tracking with respect to known or unknown scenes is essential and an incontrovertible component of vision-based Augmented Reality (AR) applications. Determining the relative motion of the camera with respect to an unknown environment with end-user hardware was made possible thanks to approaches inspired from A. J. Davison. 2003. Real-Time Simultaneous Localisation and Mapping with a Single Camera. In Proceedings of the Ninth IEEE International Conference on Computer Vision—Volume 2 (ICCV '03), Vol. 2, pp. 1403 ("Davison")—. This approach is performing real-time tracking of visual features extracted from the captured images.

A feature is a salient element in an image which can be a point (often referred to as keypoint or interest point), a line, a curve, a connected region or any set of pixels. Features are usually extracted in scale space, i.e. at different scales. Therefore, each feature has a repeatable scale in addition to its two-dimensional position in the image. Also, a repeatable orientation (rotation) is usually computed from the intensities of the pixels in a region around the feature, e.g. as the dominant direction of intensity gradients. Finally, to enable comparison and matching of features, a feature descriptor is needed. Common approaches use the computed scale and orientation of a feature to transform the coordinates of the descriptor, which provides invariance to rotation and scale. Eventually, the descriptor is an n-dimensional vector, which is usually constructed by concatenating histograms of functions of local image intensities, such as gradients disclosed in D. G. Lowe. 2004. Distinctive Image Features from Scale-Invariant Keypoints. *Int. J. Comput. Vision* 60, 2, pp. 91-110 ("Lowe").

The features need to be seen in many images for which the camera has performed a motion that is sufficient enough for estimating the depth and consequently reconstructing the 3D coordinates of the features. This is generally based on the structure-from-motion principle. In order to get correctly scaled 3D coordinates of the reconstructed points and therefore a correctly scaled camera motion, these approaches usually require an explicit manual measurement of some parts of the environment or equipping it with known objects. Another possibility to induce scale is to ask the user to perform a constrained camera motion—often the camera needs to move between two known frames such that its optical center position varies with a metrically known scaled translation.

However, there are some limitations to this type of approach. Before reconstructing a point and adding it to the feature map, the point needs to be tracked over multiple frames that have an estimated camera pose. This delays the participation of a newly visible physical point in the estimation of the full camera motion. Also, either the environment needs to be partially measured or pre-equipped or the user needs to have some experience with the system in order to correctly perform constrained camera motion that allows correct scale estimation. Lastly, since the existing approaches are mainly based on visual features (often extracted where some texture gradient is available), the online feature map that is obtained from the existing approaches is generally sparse and could not be used, even after post-processing and meshing, for occlusion handling or similar AR tasks that for example may require a meshed version of the environment.

The authors of R. A. Newcombe and A. J. Davison. 2010. Live dense reconstruction with a single moving camera. IEEE Conference on Computer Vision and pattern Recognition (CVPR), 2010 showed that with a higher computational power where a single standard hand-held video camera is attached to a powerful PC and with the usage of the computational power of the Graphics Processing Unit (GPU), it is possible to get a dense representation of a desktop scale environment and highly textured scene while performing the tracking using the PTAM method. (e.g., see G. Klein and D. Murray. 2007. Parallel Tracking and Mapping for Small AR Workspaces. In Proceedings of the 2007 6th IEEE and ACM International Symposium on Mixed and Augmented Reality (ISMAR '07), pp. 1-10; "Klein"). The density of the online created map was increased with stereo-dense matching and GPU-based implementations.

Approaches exist that work on combined range-intensity data. In addition to an intensity image they make use of a range map that contains dense depth information associated to the intensity image. The depth of a pixel refers to the distance between the principal point of the capturing device and the physical 3D surface that is imaged in that pixel.

FIG. 8 shows a scene consisting of two sets of dolls S1 and S2 (each set comprising a tall and a small doll), and a capturing device CD. A physical point PP1 of the set S1 is imaged in the pixel IP1 with the capturing device. The depth of this pixel is D1, the distance between the optical center OC of the capturing device, which defines the origin of the camera coordinate system, and the physical point PP1. Analogously, a second physical point PP2 of the set S2 is imaged in IP2 and has the depth D2. Note that an estimate of the camera intrinsic parameters (in particular focal length) allows for computing the 3D position in Cartesian coordinates of a point PP1 given its depth D1 and its pixel position on the image plane IP1.

V. Castaneda, D. Mateus, and N. Navab. 2011. Slam combining tof and high-resolution cameras. In Proceedings of the 2011 IEEE Workshop on Applications of Computer Vision (WACV '11), pp. 672-678 replaced the generally used standard hand-held video camera with a combination of a Time of Flight (204×204) resolution camera and a (640× 480) RGB camera and modified the measurement model and the innovation formulas of the Extended Kalman filter used by MonoSLAM (e.g., see Davison) to improve the tracking results. Since this approach is based on Extended Kalman filter, it provides lower accuracy compared to Keyframe based methods. As it is nicely discussed in H. Strasdat, J. Montiel and A. J. Davison. 2010. Real-time Monocular SLAM: Why Filter?. In 2010 IEEE International Conference on Robotics and Automation (ICRA), Anchorage, Ak., USA, pp. 2657-2664) in modern applications and systems, keyframe-based approach give the best accuracy per unit of computing time.

Microsoft's end-user device Xbox 360 Kinect is a low cost and relatively high resolution RGB-D camera consisting of a stereo system composed of an infra-red structured light projector combined with an infra-red camera allowing pixel depth computation and to which a camera for providing intensity images is registered. This device has directly been used by P. Henry, M. Krainin, E. Herbst, X. Ren, and D. Fox. 2010. RGB-D Mapping: Using depth cameras for dense 3d Modeling of indoor environments. In Proc. of 2010 International Symposium on Experimental Robotics (ISER '10) ("Henry") for surfel-based modeling of indoor environments. However, the proposed system does not run in real-time and works on recorded videos; it does not perform any real-time or inter-frame tracking.

Therefore, it would be beneficial to provide a tracking method for simultaneously estimating a camera motion and for determining a three-dimensional model of a real environment which takes account of the above mentioned aspects.

SUMMARY OF THE INVENTION

According to an aspect of the invention, a method for estimating a camera motion and for determining a three-dimensional model of an environment is disclosed, comprising the steps of:
g) providing intrinsic parameters of a camera;
h) providing a set of reference two-dimensional imaged points captured by the camera at a first camera pose and reference depth samples associated to the set of reference two-dimensional imaged points;
i) determining a three-dimensional model of the environment using the reference depth samples and the intrinsic parameters;
j) providing a set of current two-dimensional imaged points captured by the camera at a second camera pose and current depth samples associated to the set of current two-dimensional imaged points and determining a current three-dimensional model using the current depth samples and the intrinsic parameters;
k) estimating a camera motion between the first camera pose and the second camera pose by means of an image registration method;
l) determining based on the estimated camera motion a similarity measure between the three-dimensional model and the current three-dimensional model, and if it is determined that the similarity measure meets a first condition, updating the three-dimensional model of the environment using at least one point of the current three-dimensional model and adding the set of current two-dimensional imaged points to the set of reference two-dimensional imaged points.

Particularly, by means of the image registration method a relative camera motion between the first camera pose and the second camera pose may be estimated. For example, the determining of a similarity measure between the three-dimensional model and the current three-dimensional model may be made in a common coordinate system using the estimated camera motion.

In another aspect of the invention, steps d) to f) are repeated for each new set of current two-dimensional imaged points and current depth samples associated to that set of current two-dimensional imaged points, using the three-dimensional model and the set of reference two-dimensional imaged points resulting from a previous iteration of steps d) to f).

In the context of the present invention, a set of two-dimensional points may correspond, among others, to at least a part of an intensity image such as a color image or a grey-scale image, for example, a region of interest in an intensity image, a cluster of two-dimensional points or feature points derived from an intensity image or resulting from a segmentation algorithm performed on an intensity image and similar actions. When we speak of intensity images throughout this disclosure, we refer to images representing different amounts of light reflected from the environment, mostly depending on the environment's material and the light situation. Intensity images can encode intensity in one (e.g. greyscale) or more than one channels (e.g. RGB—red-green-blue) in different bit resolutions (e.g. 8 bit or high dynamic range).

Accordingly, the present invention proposes to make use of a set of reference two-dimensional imaged points and associated depths samples. For example, the method may use a set of reference intensity image including at least one reference intensity image, captured by a camera at a first camera pose, and depth samples associated to the at least one reference intensity image. In addition, it is proposed to make use of a similarity measure to determine whether the current set of two-dimensional imaged points and the current camera pose are added to a set of reference two-dimensional imaged points used for tracking as well as whether the current set of two-dimensional imaged points and the current depth samples associated to the current set of two-dimensional imaged points are used for creating and/or updating the three-dimensional model. In other words, a current set of two-dimensional imaged points, e.g. a current intensity image, may not be used as within a set of reference two-dimensional imaged points, e.g. as a reference image, for tracking when it or the current depth samples associated to the current set of two-dimensional imaged points do not contribute to the three-dimensional model as it is assumed that the contribution of additional information from the environment is not high enough. Consequently, the invention closes the loop between the tracking process and the reconstruction process, enabling to simultaneously estimating a camera motion and determining a three-dimensional model of the environment.

As a result of the method according to the present invention, the determined camera motion estimation is correctly scaled, for example enabling a tracking in an AR application with no need for measuring the environment or equipping it with known size objects, such as fiducial markers, and with no need for preliminary known and/or constrained camera motion. The method may be used to handle moderate to fast camera motions and visualize occlusions in challenging AR scenarios and applications by making use of the three-dimensional model of the environment as an occlusion model. It is another aspect of the invention to provide a method for estimating a camera motion and determining a three-dimensional model of an environment, comprising the steps of:
g) providing intrinsic parameters of a camera;
h) providing a set of reference two-dimensional imaged points captured by the camera at a first camera pose and reference depth samples associated to the set of reference two-dimensional imaged points;
i) determining a three-dimensional model of the environment using the reference depth samples and the intrinsic parameters;
j) providing a set of current two-dimensional imaged points captured by the camera at a second camera pose and current depth samples associated to the set of current two-dimensional imaged points and determining a current three-dimensional model using the current depth samples and the intrinsic parameters;

k) estimating a camera motion between the first camera pose and the second camera pose by means of an image registration method;

l) determining based on the estimated camera motion a similarity measure between at least one three-dimensional point in the three-dimensional model and an associated three-dimensional point in the current three-dimensional model, and if it is determined that the similarity measure meets a first condition, refining the current three-dimensional model and/or the three-dimensional model.

Particularly, by means of the image registration method a relative camera motion between the first camera pose and the second camera pose may be estimated. For example, the determining of a similarity measure between at least one three-dimensional point in the three-dimensional model and an associated three-dimensional point in the current three-dimensional model may be made in a common coordinate system using the estimated camera motion.

Further aspects, embodiments and advantageous features of the invention are evident from the following disclosure of embodiments.

Another aspect of the invention is also related to a computer program product which is adapted to be loaded into the internal memory of a digital computer and comprises software code sections by means of which the method according to the invention is performed when said product is running on said computer.

BRIEF DESCRIPTION OF THE DRAWINGS

The invention will now be described in more detail in conjunction with the accompanying drawings which illustrate various embodiments of the invention.

FIG. 1 compares a standard approach (1a) and the present invention (1b) for combined tracking and three-dimensional reconstruction of an unknown environment.

FIG. 2 shows a) the creation of the initial three-dimensional reference model and b) the simultaneous tracking and three-dimensional reconstruction of an unknown environment according to an embodiment of the present invention.

FIG. 3 shows a detailed embodiment of the decision process whether a current image is used to update the three-dimensional model of the environment according to the present invention.

FIG. 4 shows the alignment of two local meshes resulting into a combined mesh in a common coordinate system.

FIG. 5 shows an input 3D point cloud captured from one camera viewpoint by a camera (left) and its corresponding textured mesh (right).

FIG. 6 shows a refinement of the depth value of a three-dimensional point based on a determined camera motion between two images.

FIG. 7 presents the results of the evaluation of the estimated camera pose all sequences for the proposed method as well as for several PTAM initializations.

FIG. 9 illustrates a scale or size of a feature in respect to a FAST corner detector and a SIFT feature descriptor, as common examples for a method to detect point features.

FIG. 10a shows a flow diagram of a method according to an embodiment of the invention.

FIG. 10b shows a flow diagram of a method according to another embodiment of the invention.

FIG. 10c shows a flow diagram of a method according to another embodiment of the invention.

DETAILED DESCRIPTION OF THE INVENTION

Figure 8:
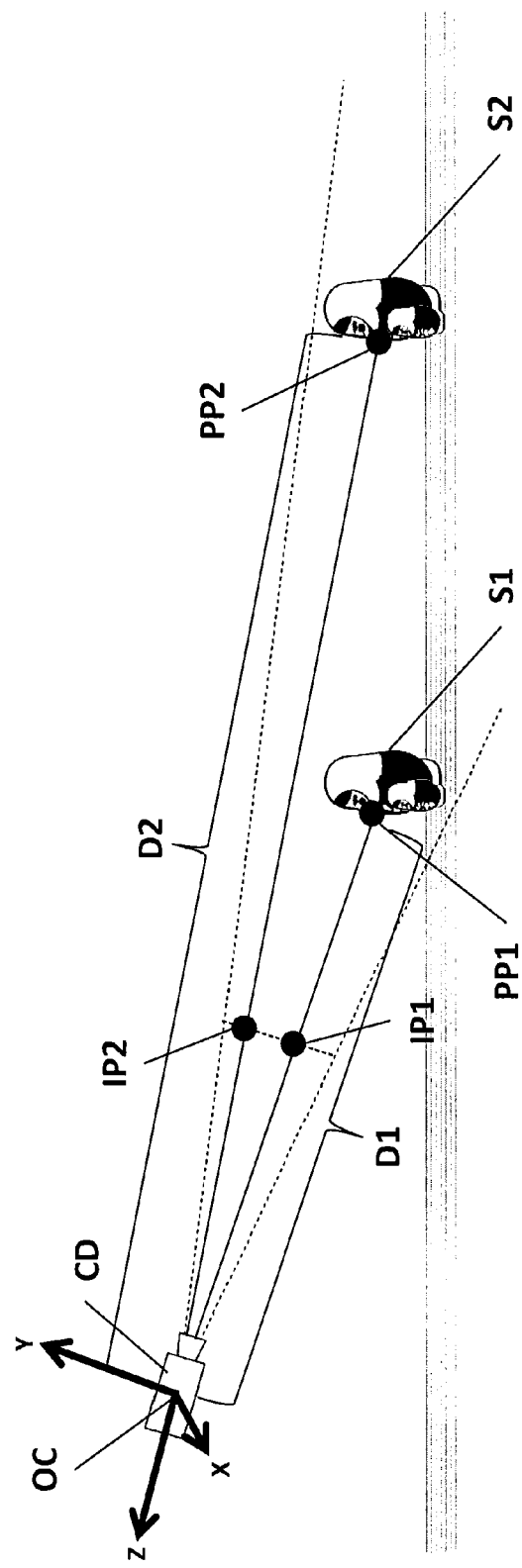
FIG. 8 shows an exemplary scene consisting of two sets of dolls with each set comprising a tall and a small doll, and a capturing device.

As described above, a set of two-dimensional intensity imaged points may be represented by at least a part of an intensity image. For sake of simplicity of the explanation, an embodiment of a method according to the present invention is described with respect to the figures wherein the set of reference and current two-dimensional imaged points are provided in form of intensity images. But it is deemed to be understood by a person skilled in the art that this only represents one embodiment of the method and does not limit the present invention to the use of complete intensity images. Rather, it is sufficient for the purposes of the invention that a set or subset of two-dimensional intensity imaged points and depth samples rather than complete intensity images and/or depth images are used in the calculation process.

In FIG. 1a, a standard approach for combined tracking and reconstruction of a three-dimensional model from an unknown environment according to the state of the art is depicted in Henry. In this example, the reconstruction process is a meshing process (P2). In other words, the three-dimensional model is acquired in form of a meshed three-dimensional point cloud. But it is obvious to a person skilled in the art that the embodiment depicted in this and the following figures shall not limit the method according to the present invention to the determination of meshed three-dimensional point clouds. A person skilled in the art appreciates that by use of a suitable reconstruction method, a three-dimensional model may also be determined as a three-dimensional point cloud, an edge-based model, a Bezier surface model, a three-dimensional CAD model, or a volumetric model from the set of current and/or reference two-dimensional imaged points and associated depth samples.

In the embodiment depicted in FIG. 1a, at least one current intensity image captured by a camera is provided to a tracking process (P1). In addition, current depth samples associated to that current intensity image are provided to a meshing process (P2). Methods for providing depth samples associated to an intensity image are disclosed in more detail below. In the tracking process P1, at first a current camera pose is estimated based on the current intensity image and a set of reference images (see below). Optionally, the camera pose estimation may also make use of the current depths samples.

In a next step, it is then determined whether the difference between the current camera pose and the reference camera pose(s) associated to the reference intensity image(s) within the set of reference images is above a certain threshold. For example, the determined camera pose has a translation further than a defined threshold from the references camera poses associated to the references intensity images within the set of reference images, indicating that the current intensity image has been captured from a relatively new view point. If it is determined that the difference is above the threshold, the current intensity image and the determined current camera pose are added to the set of reference images in order to be used for further tracking in P1.

In addition, the current camera pose, the current depth samples associated to the current set of two-dimensional imaged points serve as input to the meshing process P2. Here, in a first step a similarity measure is determined between the existing mesh, i.e. the three-dimensional model, and the additional information provided by the current depth samples based on the current camera pose. When the similarity measure is above a defined threshold, the current set of two-dimensional imaged points, e.g. the current image, and the current camera pose are used to update the existing mesh. For example, the similarity measure may be defined such that at least one three-dimensional point within the current depth samples must not yet be included in the mesh in order to be used to update the mesh. An initial mesh may be created in the very first iteration of the meshing process P2. In this case, the similarity measure defined as described above would indicate that all three-dimensional points from the current camera view point are not yet included in the mesh and therefore the current depth samples would be used to create the first estimate of the mesh. Advantageously, additional information such as color and texture information may be gained from the current intensity image and used to color the three-dimensional model.

Summarizing the above, it becomes obvious in FIG. 1a, that the decision instances for the tracking process P1 and the meshing process P2, i.e. the creation of the three-dimensional model, are completely independent. A current intensity image may be added to the set of reference images even if it would not contribute to the reconstructed three-dimensional model of the environment (i.e. if it fails in the similarity test). On the other hand, a current intensity image may be discarded just because the translational movement of the camera was not big enough and thus the baseline required for a SLAM-based tracking, for example, was not sufficient even though the rotational movement may be significant.

In FIG. 1b an exemplary embodiment of the present invention is depicted where a difference to the above described procedure according to the state-of-the-art becomes clearly visible. Instead of having two independent decision instances for the tracking process P1 and the reconstruction process P2 of the three-dimensional model, it is determined based on a similarity measure whether the current intensity image and the current camera pose are added to the set of reference images used for tracking as well as whether the current intensity image and/or the current depth samples associated to the current intensity image are used for creating and/or updating the three-dimensional model. In other words, a current image may not be used as a reference image for tracking when it does not contribute to the three-dimensional model as it is assumed that the contribution of additional information from the environment is not high enough. Consequently, the invention closes the loop between the tracking process P1 and the reconstruction process P2, enabling to simultaneously estimate a camera motion and building a three-dimensional model of the environment. In addition, the method according to the present invention is able to track from the very first frame as was explained above.

A more detailed view on the invention is presented in the embodiment depicted in FIG. 2a and FIG. 2b. FIG. 2a shows the creation of the initial three-dimensional reference model from the reference depth samples associated to the at least one reference intensity image. In S1, the reference three-dimensional point cloud is computed using the depth samples associated to the reference intensity image. For every homogeneous 2D image point $p_i$ with a measured depth value $z_i$, the corresponding inhomogeneous 3D point $x_i$ is:

$$x_i = z_i K^{-1} p_i$$

where K is the (3×3) upper triangular matrix of the camera intrinsic parameters.

Given the registered reference intensity image, a color may be associated to every three-dimensional point as shown in FIG. 5 (explained in more detail below).

According to an embodiment of the invention, a threshold for the distance of the three-dimensional point to the camera may be defined and only three-dimensional points having a distance below this threshold are selected for the meshing. In other words, at least one of the current depth samples may be discarded if it is determined that the depth value is above a defined threshold. That way, only points that are not farther than a certain distance from the depth sensor are retained in the current three-dimensional model. This helps to improve the quality of the current three-dimensional model in case the uncertainty of the depth measurement increases significantly with the depth.

In the next step S2, a reference mesh is determined from the three-dimensional point cloud, for example, by defining triangles within the three-dimensional point cloud. Optionally, the meshing may be optimized by the use of known neighborhoods when the reference intensity image is considered in addition.

In FIG. 2b, the simultaneous tracking and three-dimensional reconstruction of an unknown environment according to an embodiment of the present invention is depicted, wherein at least one reference intensity image, reference depth samples associated to the at least one reference intensity image and the at least one associated camera pose as well as an initial estimate of the three-dimensional model of the environment (determined as described above) serve as input. According to the depicted embodiment, a current intensity image and current depth samples associated to that current intensity image are provided. Then a current three-dimensional point cloud, i.e. a current three-dimensional model, is determined using the current depth samples associated to the current intensity image and the intrinsic parameters (S3). Optionally, the current three-dimensional point cloud may also be meshed in S3 (not shown in FIG. 2b).

In addition, the movement of the camera between at least one reference intensity image from a set of reference images and the current intensity image is determined (S4) by means of an image registration method in order to determine the pose of the camera while capturing the current intensity image.

Steps S3 and S4 may be processed sequentially or in parallel on different instances or copies of the current intensity image.

Using the determined current camera pose, in S6 a similarity measure between the reference three-dimensional model of the environment and the current three-dimensional model is determined in a common coordinate system. For example, this may be achieved by using the determined camera pose for rendering the three-dimensional model into the coordinate system of the current view of the camera (i.e.t into the coordinate system of the current three-dimensional model) and thus determining a depth map of the reference three-dimensional model in the coordinate system of the current view of the camera (S5). The similarity measure may then be determined between three-dimensional model, for example, by using the reference depth map of the reference three-dimensional model, and the current three-dimensional model which may be for example an unmeshed or meshed three-dimensional point cloud (S6).

The similarity measure is indicative of the overlap between the reference three-dimensional model and the current three-dimensional model. When performing real-time tracking as it is for example common in AR applications, the camera has a typically small inter-frame movement, i.e. between two images. For example, this means that there is a large overlap between two meshes created of two consecutive images. This overlap needs to be taken into account since otherwise, when every new captured intensity image and depth samples associated to that intensity image would be integrated into the reference three-dimensional model, the capacity of the main memory would be exceeded after a couple of minutes because of the potentially massively redundant data. For example, in FIG. 4, a first three-dimensional model in form of a first mesh M1 and a second three-dimensional model in form of a second mesh M2 are depicted. When aligning M1 and M2 in a common coordinate system, in this case the overlap between the meshes is small. By combining the two meshes into a combined three-dimensional model CM, a more comprehensive reconstruction of the environment is achieved without adding a large amount of redundant data.

In the following step S7, it is thus determined depending on the similarity measure whether to update the estimate of the three-dimensional model of the environment using at least one point of the three-dimensional point cloud determined from the current depth samples associated to the current intensity image (S8a) and whether the current intensity image including its determined associated camera pose is added to the set of reference images (S8b). For example, if the similarity measure does not meet a first condition, for example does not exceed a defined threshold, the current intensity image and the current depth samples associated to the current intensity image would be discarded. In this case, steps S3 to S7 would be repeated for a new current intensity image and current depth samples associated to that new current intensity image based on the non-updated three-dimensional model and the set of reference images including at least the reference image. If the similarity measure does exceed the threshold, step 8 is processed and steps S3 to S7 are then repeated based on the updated reference three-dimensional model of the environment and the updated set of reference images including at least the reference image and the current intensity image of the previous cycle as additional reference intensity image. The updating of the three-dimensional model of the environment (S8a) may comprise concatenating two three-dimensional point clouds which may be achieved by transforming the three-dimensional points with the inverse of the camera pose associated to the current intensity image. Other methods of combining two or more meshes are known to a person skilled in the art, e.g. as disclosed in G. Turk and M. Levoy. 1994. Zippered polygon meshes from range images. In *Proceedings of the 21st annual conference on Computer graphics and interactive techniques* (SIGGRAPH '94). ACM, New York, N.Y., USA, pp. 311-318 ("Turk").

FIG. 3 shows a detailed embodiment of the decision process whether the current depth samples associated to a current intensity image are used to update the three-dimensional model of the environment (steps S7 to S8a of FIG. 2) according to an embodiment of the invention.

As described above, it may be defined that only three-dimensional points that are not farther than a certain distance from the current camera view are retained due to increasing noise with distance. According to another aspect of the invention, for at least one point in the current three-dimensional point cloud it may further be determined whether an associated three-dimensional point exists in the reference three-dimensional model. In addition, it may be determined whether the difference between the depth of the point in the current three-dimensional point cloud and the depth of the determined associated three-dimensional point in the reference three-dimensional model is above a defined threshold.

Based on this information, a filtering of the three-dimensional points may be performed or the similarity measure may be defined in various ways. For example, it may be defined that for every captured current intensity image and current depth samples associated to that current intensity image, only the three-dimensional points that are imaged for the first time may be used to extend the reference three-dimensional model. In other words, it may be defined that only points in the current three-dimensional point cloud for which no associated three-dimensional point in the three-dimensional model is determined are used for updating the three-dimensional model in S8a. The similarity measure for S7 would then be defined such that the number of points in the current three-dimensional point cloud for which no associated three-dimensional point in the reference three-dimensional model is determined (numPixel, S6b) must exceed a certain threshold which would be equal to one.

As depicted in FIG. 3, this may be achieved by using a binary mask and depth buffer. For example, in S6a a binary mask is created wherein it may be defined that a point in the current three-dimensional point cloud for which a depth sample is available has no associated three-dimensional point in the reference mesh when the difference between depth value in the reference mesh and the current depth value is greater than zero. In order to close small gaps in the reference mesh which especially occur on the boundaries of registered depth maps, the binary mask may be eroded such that new geometry may also be added on the boundaries despite already existing geometry closer than the threshold. Three-dimensional points for which no geometry was rendered at their reprojected two-dimensional position would be unmasked and may be directly considered for updating the mesh (S8a).

However, only relying on the binary mask would prohibit adding information from objects that are first observed in front of an already reconstructed geometry, which e.g. happens when moving the camera around a fixed object in an attempt to scan its geometry. According to another aspect of the invention, it may be checked for the masked pixels whether the depth stored in the rendered depth buffer is greater than the value of the depth map by at least some defined threshold for also adding close objects.

According to another aspect, the similarity measure may be defined such that the number of added triangles to the reference mesh of the three-dimensional model must exceed a certain threshold. According to another aspect, the similarity measure may be defined such that the physical size of the added mesh must exceed a certain size, for example given in square millimeter.

Optionally, in S8, the estimated camera motion based on the at least one reference intensity image and the current intensity image may be used to refine the current three-dimensional point cloud and/or the reference three-dimensional model. This may be achieved by determining based on the estimated camera motion the depth of a three-dimensional point in the three-dimensional model and the depth of that three-dimensional point from the current depth samples associated to the set of current two-dimensional imaged points; determining a refined depth of that three-dimensional point from the depth of the three-dimensional point in the three-dimensional model and the depth of the associated three-dimensional point in the current three-dimensional model; and updating the depth of the three-dimensional point in the current three-dimensional point cloud and/or in the three-dimensional model with the determined refined depth (see FIG. 6). For example, by means of an image matching method, the feature point F1 from the reference intensity image is determined in the current intensity image. Then, a refined depth value may be determined from the depth value associated to the feature point F1 in the reference intensity image and the depth value associated to the determined matched feature point F1 in the current intensity image.

According to an aspect of the invention, the method may further comprise recording the similarity measure and/or the variance of the similarity measure over time and if it is determined that the similarity measure and/or the variance of the similarity measure in a defined time frame meets a second condition, the three-dimensional model is no longer updated and the current set of two-dimensional imaged points are no longer added to the reference set of two-dimensional imaged points. Furthermore, the method may include determining the frequency of the similarity measure meeting the first condition and if it is determined that the frequency of updates falls below a defined threshold, the three-dimensional model is no longer updated and the current set of two-dimensional imaged points are no longer added to the reference set of two-dimensional imaged points.

It is further an aspect of the invention to provide a method for determining a three-dimensional model of the environment, wherein a similarity measure between at least one three-dimensional point in the three-dimensional model and an associated three-dimensional point in the current three-dimensional model based on the determined estimate of the camera motion is determined, and if it is determined that the similarity measure meets a first condition, refining the current three-dimensional model and/or the three-dimensional model. The associated three-dimensional point in the current three-dimensional model may be determined based on the estimated camera motion.

In this case, the similarity measure may be defined as a difference between the depth of the three-dimensional point in the three-dimensional model and the depth of that associated three-dimensional point in the current three-dimensional model. The refined depth of the three-dimensional point may be determined from the depth of the three-dimensional point in the three-dimensional model and the depth of the associated three-dimensional point in the current three-dimensional model and is used for updating the depth of the three-dimensional point in the current three-dimensional model and/or in the three dimensional model.

Below, preferred embodiments of several aspects of the invention shall be explained in more detail.

Possible Methods to Provide Depth Samples

There are several methods possible to provide depth of an element, e.g. a pixel, in an image which may be used by a method according to the present invention which will be described in the following paragraphs.

Depth from Calibrated Cameras:

According to an embodiment to determine a depth of at least one element in an intensity image, at least two capturing devices with known relative position and/or orientation each capture a respective intensity image, wherein correspondences are found in the images and the relative position and/or orientation of the capturing devices is used to calculate a depth of at least one element in the intensity images which is part of at least one of the correspondences.

Particularly, one possibility to provide depth data is as follows: At least two cameras, recording intensities with known relative pose and ideally known intrinsic parameters, can capture images at approximately the same time or, when not moving, at different times. Correspondences can be found in both images and the relative pose and intrinsic of the cameras can be used to calculate the correspondences depth in either image coordinate system. It is advantageous to retrieve the relative pose and intrinsic parameters before trying to find correspondences, because they can be used to simplify the creation of correspondences through introducing additional constrains (e.g. epipolar geometry).

For example, the finding of correspondences based on point features can be implemented as follows: To match a 2D feature from one image to another, the patch around the 2D feature of specified size is searched in the other image. For instance, the sum-of-square-differences (SSD) or the normalized cross-correlation (NCC) can be used as distance or similarity measure, respectively. To reduce the number of comparisons needed to search the corresponding patch, it is only searched along the epipolar line of the feature point in the other image. To simplify the search along the epipolar line to a 1D-search, the images are first rectified. The two patches with the highest similarity are set into relation. If the one with the highest similarity is significantly more similar than the second highest similarity, the former one will be considered as matching correspondence.

Of course, to the expert it is clear, that many possibilities exist to gain correspondences. It is also possible to gain correspondences without taking into account the epipolar-lines. Of course, the process can also be implemented in an iterative fashion, using initial depth estimations to work with our proposed real scale feature descriptors and recalculate the correspondences and positions of the features with higher accuracy.

Depth from at Least One Moving Camera:

According to another embodiment to determine a depth of at least one element in an intensity image, at least one capturing device captures intensity images at different points of time from different positions, wherein correspondences are found in the different images and a relative position and/or orientation of the capturing device between the different images and a structure of the correspondences are recovered and used to calculate a depth of at least one element in the intensity images which is part of at least one of the correspondences.

For example, at least one camera takes images at different points of time from different positions. Ideally some additional sensor measurements are available (for example GPS positions). The images and additional information, if available, are then analyzed. Correspondences in the different images are found, for example by tracking features from image to image or by detecting local features and using scale invariant descriptors to match them. Then, a so called structure from motion (SfM) approach is used to recover the relative poses between the different images and the structure of the correspondences. There are many different approaches known to the skilled person. Ideally additional sensor data, like GPS positions or known movement of the camera (e.g. in a car by measuring the car's movement) can be used to give the structure of the correspondences a physical scale. Alternatively if in any image a known object, with known size can be retrieved (e.g. a dollar bill or a marker), physical scale can also be retrieved. In case physical scale cannot be retrieved, a scale is assumed and, our approach can still be used, but will only make sense for further matching in this exact scenario. For example in order to track camera movement in order to superimpose game-characters for a video game, the exact size of the movements might not matter, but realistic relative movements are important. Increased matches through real scale feature descriptors can help here.

Again, this process can be implemented in an iterative way, using initial scale estimations to refine the correspondences, leading to higher accuracy in pose estimations and structure.

Depth from Image Matching:

According to another embodiment to determine a depth of at least one element in an intensity image, there is provided at least one database of intensity images, wherein for each of the intensity images an overall depth, or depth for at least one image region, or depth for one or more pixels is known and the intensity image captured by the capturing device (current intensity image) is matched against this database. The matching result is used to calculate a depth of at least one element in the current intensity image.

For example, an approach to retrieve depth associated to an image is as follows: We assume a database of images exists and for each image either one overall depth (e.g. 10 m) or depth for individual image regions or depth for each pixel is known. The current image taken is now matched against this database. In order to speed up the process and/or to increase robustness, an optional step can be used to create an optimized data structure for image matching. This can for example be building a vocabulary tree or a KD-tree from the feature descriptors.

The method can try to register both images using the detailed depth information (if existing) from the database image and our proposed real scale feature descriptors or using other methods. If this is not possible or no detailed depth information is provided, the one given depth or the average depth is returned.

Depth from 3D Model Information and Sensor Information:

According to another embodiment to determine a depth of at least one element in an intensity image, there is provided an environment model and information about a position and/or orientation of the capturing device when capturing the intensity image with respect to the environment model (which may be an initial estimation), wherein the environment model and the information about the position and/or orientation of the capturing device are combined and used to calculate a depth of at least one element in the intensity image.

For example, assuming an environment model can be provided, which can for example be a constructed 3D model or a scan of the environment. If any information is known about the position and/or orientation of the capturing device when the image was taken with respect to the environment model, both can be combined. For example, by rendering the 3D model with the assumed camera pose and camera intrinsic, the depth of every pixel can be obtained from the depth buffer provided by the environment model and used during rendering. Although an initial pose estimation is necessary for this approach, using the assumed depth and the present invention with a textured environment model, the pose can then be refined and become more accurate, among other applications. Of course this process might also be used iteratively.

Depth from Dedicated Sensors:

According to another embodiment to determine a depth of at least one element in an intensity image, there is provided at least one sensor for retrieving depth information or range data and at least a relative position and/or orientation of the at least one sensor with respect to the capturing device, wherein the depth information or range data is used to calculate a depth of at least one element in the intensity image. Preferably, the pose (position and orientation) and intrinsic parameters of, both, the sensor and the capturing device are known.

Particularly, a method to retrieve depth information is using special sensors, specialized on retrieving depth information or range data. That can for example be a time of flight mechanism, like a laser scanner or a time of flight camera. Another example are sensors, which project a known pattern of light into the environment and retrieve the pattern after it was reflected by the environment with a sensor. By matching the projected information and the received pattern and by knowing the pose of the projector towards the retrieving sensor and by knowing the intrinsic parameters of both projector and sensor, depth can be calculated.

Another sensor allowing the retrieval of depth data is a plenoptic camera; e.g., see D. V. Johnston, Learning Depth in Lightfield Images, CS229 Machine Learning Autumn 2005, Stanford University, 2005; http://www.stanford.edu/class/cs229/proj2005/Johnston-LearningDepthInLightfield-Images.pdf.

In order to use the depth-sensor's information with the intensity image, the pose and intrinsics of both are known. The depth information can then be transformed into the camera coordinate system and be used.

Camera Motion Estimation

It is an aspect of the invention to estimate the relative camera motion between the first and the second camera poses, i.e. between capturing the set of reference two-dimensional imaged points and capturing the set of current two-dimensional imaged points by means of an image registration method. According to an aspect of the invention, the image registration method may be feature-based or intensity-based. It may be based on the two-dimensional imaged points, e.g. the intensity images only, or it may also take into account the depth samples associated to the set of reference two-dimensional imaged points and depth samples associated to the set of current two-dimensional imaged points.

In the feature-based image registration method, two-dimensional image features from the set of reference two-dimensional imaged points, e.g. at least one reference intensity image may be extracted and the camera motion may be estimated by determining two-dimensional correspondences based on the extracted image features. Furthermore, it may be advantageous to extract two-dimensional image features also from the set of current two-dimensional imaged points, e.g. the current intensity image, and to use the extracted current features in addition to the extracted image features from the set of reference two-dimensional imaged points for determining the correspondences.

An intensity-based image registration method may be based on an iterative minimization process, wherein a first set of pixels from the set of reference two-dimensional imaged points is compared with a computed set of pixels from the set of current two-dimensional imaged points and the computed set of pixels from the set of current two-dimensional imaged points used for the comparison varies at each iteration. For example, the comparison in the image registration method may be based on image intensity differences such as described in B. D. Lucas and T. Kanade. 1981. An iterative image registration technique with an application to stereo vision. In *Proceedings of the 7th international joint conference on Artificial intelligence—Volume* 2 (IJCAI '81), Vol. 2, pp. 674-679.

Given 2D-2D correspondence between the two RGB-D images, it is possible to compute the 3D position of the reference image 2D features by unprojecting them as presented in equation (1). This gives a set of 2D-3D correspondences which can be used for pose estimation, for example by applying the PTAM method disclosed in Klein.

Optionally, the camera pose estimation may be determined based on 3D-3D correspondences which were established from 2D-2D matching. From these correspondences, e.g. the method of [9] can be used which has the advantage of being computationally cheaper than the 2D-3D approaches. When using 3D-3D correspondences, a depth image computed from the current depth samples would also be provided as an input to S4 in FIG. 2b (not shown).

Furthermore, the pose may be further refined by applying a depth data-based method such as an iterative closest point (ICP) method; e.g., see P. J. Besl and N. D. McKay. 1992. A Method for Registration of 3-D Shapes. *IEEE Trans. Pattern Anal. Mach. Intell.* 14, 2 (February 1992), pp. 239-256; Z. Zhang. 1994. Iterative point matching for registration of free-form curves and surfaces. *Int. J. Comput. Vision* 13, 2 (October 1994), pp. 119-152. In this case, the initialization or continuous tracking may be realized by the method according to the invention and an additional refinement of the pose may be achieved.

In case the proposed method acquires a textured 3D model, another possibility to establish the image registration would be to follow the "analysis by synthesis" direction of tracking in which iteratively the entire textured model is rendered using the current camera pose estimate followed by a 2D optical flow tracking from the synthetic generated view to the captured camera image until convergence.

Optionally, in S4, a closest subset of reference two-dimensional imaged points may be selected from the set of reference two-dimensional imaged points for estimating the camera motion based on either difference between associated camera pose(s) or image alignment. Using the closest subset, e.g. a closest image instead of multiple images has obviously a positive effect on the speed of the method while it is also backed by the reasonable assumption that visually, the e.g. physically closest reference image should be also the most visually similar one which in turn results in a better registration.

Feature Detection and Description

As described above, the method according to the present invention may be using a feature-based image registration method. A strong limitation of any two-dimensional computer vision method is that it operates in a projected space. This makes it impossible to distinguish scale resulting from the distance of an object to the camera from scale resulting from the actual physical scale of an object. Invariance to scale resulting from the distance of the camera to an object is clearly desirable in many applications, and was the original motivation for scale-invariance. However, in the presence of similar features at different physical scales, invariance to scale makes them indistinguishable. For instance, a descriptor as described in Lowe would not be able to distinguish between a real building and a miniature model of it. Besides that, approaches that provide scale-invariance by computing a repeatable scale of a feature from image intensities are highly depending on the accuracy and repeatability of this computed scale.

According to embodiments of the invention, the method thus also includes a method of detecting and describing features from an intensity image which is invariant to scale resulting from the distance between the camera and the object, but is sensitive to the real (physical) scale of an object for a variety of applications. This method may be used in connection with providing the set of reference and/or current two-dimensional imaged points captured by the camera and the reference and/or current depth samples according to steps b or d. In this regard, various embodiments of such method are possible as set out as follows:

In one embodiment, the method may comprise the steps of providing an intensity image captured by the camera, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

According to another embodiment of the invention, the method may include a method of detecting and describing features from an intensity image, comprising the steps of providing an intensity image captured by a camera, providing a method for determining a depth of at least one element in the intensity image, detecting at least one feature in the intensity image based on image intensity information provided by the intensity image, providing a feature descriptor of the at least one detected feature, wherein the feature descriptor contains at least one first parameter based on image intensity information provided by the intensity image, and contains descriptor coordinates which are scaled depending on the depth of at least one element in the intensity image being a part of the detected feature, or wherein the feature descriptor describes the detected feature based on information provided by the intensity image in a support region around the detected feature, wherein the support region is scaled depending on the depth of at least one element in the intensity image being a part of the detected feature.

According to another embodiment of the invention, the method may include a method of detecting and describing features from an intensity image, comprising the steps of providing an intensity image captured by a camera, providing a method for determining a depth of at least one element in the intensity image, detecting at least one feature in the intensity image based on image intensity information provided by the intensity image, and providing a feature descriptor of the at least one detected feature with an indicator of a particular scale, the feature descriptor containing at least one first parameter based on information provided by the intensity image, and at least one second parameter indicative of a combination of the scale and a depth of at least one element in the intensity image being a part of the detected feature. When referring to descriptor coordinates, we refer to the coordinates of the intensity values, from which the descriptor is build in relation to a defined feature center. FIG. 3 helps to understand the concept.

It is thus proposed to utilize the depth of an element in the intensity image (e.g. a pixel) for feature detection and/or description at that particular element (pixel) in an intensity image. Thereby, features can be detected and described at real (physical) scale, providing an improved distinctiveness compared to standard scale-invariant feature descriptors on intensity images without introducing any constraints on the camera movement.

According to an embodiment, in the proposed methods a decision is made in the feature detection process whether at least one element in the intensity image belongs to a detected feature or not depending on intensity values in the intensity image.

Particularly, according to an embodiment of the invention, the proposed methods detect and describe features based on intensity images only. Particularly, the depth of a feature is used to improve the process by relating to a real (physical) scale, but in contrast to the state of the art, any other knowledge of the local geometry around a feature is not used.

The methods according to these embodiments in an aspect use one scalar value only, which is an indication of a distance, to improve the detection and/or description of a feature which is both detected and described solely from the 2D intensity image.

Different methods exist to provide depth information associated to particular pixels in an intensity image. Examples include stereo vision, time-of-flight cameras and approaches using structured light. In the following, we assume that we are provided with an intensity image and a method for determining a depth of at least one element in the intensity image. This method can for instance be a lookup operation in an associated depth map (possibly using interpolation and/or extrapolation) or it can be the computation of depth from stereo given a second intensity image containing the corresponding physical element from a different view.

1. Feature Detection at Real Scale According to an Embodiment of the Invention:

Generally, a method according to this aspect comprises the steps of providing an intensity image captured by a capturing device, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image and at least one second parameter which is indicative of the scale.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

A feature is a salient element in an image which can be a point (often called keypoint or interest point in the literature), a line, a curve, a region or any other subset of the image. Feature detection algorithms are usually saliency detectors. For example, they find lines, edges, or local extrema of a differential operator. A feature detector can be seen as a function mapping a region of pixels to a response. In the literature, this region is referred to as sampling window, support region or measurement aperture of the feature detector. The response is eventually thresholded to decide which elements are features and which are not. In order to extract features at a certain scale, either the sampling window or support region can be scaled accordingly or the image is scaled with the inverse scale factor before computing the response of the feature detector. The scale (or size) of a feature is then defined as the size of the sampling window or support region used to detect it.

In this context, FIG. 9 illustrates a size of the FAST corner detector (illustration on the left side), as common example for a method to detect point features. In this example, the scale (or size) of a feature F is defined as "scale1" or "scale2" as shown which corresponds to the size of the sampling window or support region (here defined by the circular set of pixels) used to detect it. On the left side of FIG. 9, the image region (here delimited by the circular set of pixels) that contributes to the decision if a pixel is a feature or not (sampling window or support region) is shown at two different scales, scale1 and scale2 designating two different sizes of the support region.

For example, in an aspect of the invention, the method comprises the steps of defining a support region as a region covering a portion of the intensity image, detecting at least one feature in the intensity image based on information in the support region around the feature, wherein a size of the support region is determined in correspondence with the scale at which the at least one feature is detected.

According to an embodiment, the scale at which the at least one feature is detected depends on a depth sample for the support region. For example, the support region is scaled inversely proportional to the depth of at least one element in the intensity image for which the feature detection process determines whether it is a part of the detected feature.

Common examples for feature detection methods include Laplacian of Gaussian (LoG), Difference of Gaussians (DoG), Determinant of Hessian (DoH), Maximally stable extremal regions (MSER), Harris features, or learning-based corner detectors such as FAST. To detect edge features, widely known algorithms such as Canny, Sobel or Prewitt can be applied.

For example, feature detection is performed at at least one scale that depends inversely proportional on the depth of at least one element in the intensity image for which the feature detection process determines whether it is a part of a detected feature.

According to an embodiment, the at least one scale at which the at least one feature is detected corresponds to a physical size of the feature.

In one possible implementation of this invention, it is proposed to make the decision if an element is a feature or not depending on the values in the intensity image and the depth of that element. More specifically, for each detected element, the feature detection is carried out at one or more scales that depend inversely proportional on the depth of the putative element.

In one implementation of the invention, the feature detection only uses one real scale (e.g. in mm) to detect features. In another implementation, more than one real scales (e.g. in mm), which depend on the depth are used to detect features (e.g. 30 mm and 60 mm for features further away than 50 cm and closer than 100 cm). Therefore, while the image scale (in pixels) is turned to real scale, for example by making it inversely proportional to the depth, the physical or real scale in metric distances can be scaled differently and independently.

Thereby, the scale(s) at which features are detected correspond to a real (physical) size instead of a scale in camera pixel units.

An estimate of the focal length of the capturing device is needed to detect features at absolute real scales.

FIG. 10a shows a flow diagram of an exemplary embodiment of this approach according to this aspect of the invention. Step S51 captures an intensity image with a capturing device, such as a camera, or loads an intensity image, and provides a method to determine the depth of at least one element, such as a particular pixel, in the intensity image (regarding possible implementations of such a method, further details are provided above). Step S52, which defines at which scales to extract features, is depending on depth samples. For each support region, which can be as small as a pixel, the scale(s) at which to detect features in the intensity image depend(s) on a depth sample for the region. In one embodiment of the invention the support region consists of more than 8 pixels. As explained above, one possible way of determining scales from the depth is an inversely proportional relationship which results in real (physical) scales. Afterwards, step S53 generates representations of the provided intensity image for different scales. In step S54, features are detected at the desired scales. Particularly, in the feature detection process respective representations of the intensity image for different scales are generated and features in the intensity image are detected at the respective scales. For feature description, at least one orientation is assigned in step S55, e.g. as the dominant gradient direction of neighboring pixels or using an orientation sensor measurement, e.g. aligned with the gravity force. Eventually, the features are described in step S56 considering their scale and orientation and step S57 uses the described features as in the standard approach.

Note that particularly steps S53 and S54 are exemplary. Any method that allows detecting features at different scales can be applied here, including those methods that scale their sampling apertures (or support regions) instead of working on scaled versions of the intensity image.

An embodiment of the invention uses point features (i.e. keypoints or interest points). The feature detection is in this case performed with a method that decides for a single point in an image (i.e. a pixel) if it is a feature or not based on the image intensities in a sampling window around the point.

For example the FAST corner detector, which is frequently used as feature detector, would be used in an implementation of the invention as follows. Given a pixel, the detector determines if it is a feature (corner) or not depending on its intensity and the intensities of pixels on a circle around it with a radius of 3.5 pixels. The proposed method would first determine the depth of that pixel from a depth-providing method. Given this depth ($Depth_{real}$), a desired real scale ($Radius_{real}$), and the focal length of the capturing device in pixels ($FocalLength_{pixel}$), the diameter or radius in pixels ($Radius_{pixel}$) corresponding to the desired real scale can be computed as follows:

$$Radius_{pixel} = FocalLength_{pixel} * Radius_{real} / Depth_{real}$$

As explained above, the scale in the image corresponding to some real scale on the sur-face varies inversely proportional to the depth. This is one possible way of determining scales from the depth.

To detect a feature at the real scale which corresponds to the radius $Radius_{real}$ for the FAST corner detector, either a modification of the original detector would be used that operates with a radius of $Radius_{pixel}$ pixels instead of the default 3.5 pixels, or a patch around the candidate pixel with a radius of $Radius_{pixel}$ is scaled by a factor of $Radius_{pixel}/3.5$, and detection is carried out with the standard detector on that scaled image patch.

Instead of providing an individual scale for each depth, it might be computationally advantageous to assign a range of depths to a scale. E.g. the range of 5-10 m is assigned the scale of 100 mm and the range above 10 m is assigned to 300 mm. Another possible embodiment of the invention might use other depth-indicating values, instead of the depth, as described above. One embodiment uses the z-value of a Cartesian coordinate system centered at the camera, where the z-axis is collinear with the camera's optical axis.

In general, it is also clear, that the depth or distance, does not have to be exactly measured from the camera's center.

Optionally, the image, or part of the image, can be undistorted, according to additional intrinsic parameters before the features are extracted or the descriptor is built.

The present invention does not need the expensive steps of normal computation (which requires dense depth data), back-projection of the image into 3D, and triangulation. Instead of an image mesh, the approach of the invention uses a simple 2D intensity image for creating scale spaces. It does not perform any normalization of the neighborhood based on the tangent plane and also does not consider the normal in the feature description at all.

Particularly, according to the invention, during the feature detection process no 3D mesh based on the depth data is created.

2. Feature Description at Real Scale According to a Further Embodiment of the Invention:

Generally, a method according to this aspect comprises the steps of providing an intensity image captured by a camera, providing a method for determining a depth of at least one element in the intensity image, detecting at least one feature in the intensity image based on image intensity information provided by the intensity image, and providing a feature descriptor of the at least one detected feature.

In a first possibility, the feature descriptor contains at least one first parameter based on image intensity information provided by the intensity image, and contains descriptor coordinates which are scaled depending on the depth of at least one element in the intensity image being a part of the detected feature.

Alternatively, in a second possibility the feature descriptor describes the detected feature based on image intensity information provided by the intensity image in a support region around the detected feature, wherein the support region is scaled depending on the depth of at least one element in the intensity image being a part of the detected feature.

A feature descriptor describes a feature based on the available information in a support region of the image around the feature. The scale of a feature descriptor is the size of that support region. For clarity and as an example, FIG. 9 illustrates on the right side of the illustration the support region of a SIFT descriptor (here defined by a frame or rectangle with a contrast gradient depicted as straight line) at two different scales, scale3 and scale4 designating different sizes of the support region, here of the frame or rectangle.

The scale of a descriptor is usually chosen linearly depending on the scale of the feature to describe. In one preferred embodiment of this invention, the supporting pixels used for building the feature descriptor consist of pixels specified by a geometry around a pixel (e.g. on the edge of a circle, or all pixels inside an ellipse), which has been identified as a feature, where the geometry only varies according to depth. The variation can be resizing the geometry or changing the shape of the geometry at different depths. Different depths can be intervals, for example 0-0.5 m and 0.5 m-5 m and above 5 m. Note, that by support region we refer to the part of the support region that has non-zero contribution weights.

For example, supporting points in the intensity image are used for providing the feature descriptor which comprise points specified by a geometry around one of the points which has been identified in the feature detection process as being a part of the detected feature, wherein the geometry varies according to the depth of the one of the points, particularly wherein the variation can be resizing the geometry or changing the shape of the geometry at different depths.

According to an embodiment, support regions at different real scales are used, wherein of these support regions a support region is determined to be smaller at a smaller determined depth and larger at a greater determined depth.

A feature descriptor can be a real-numbered vector, e.g. SIFT or SURF, but can also be classification-based approach such as random FERNS. In addition, statistical descriptors, like curvature or (physical) length of a contour can be used. In essence, any method that enables matching of features is considered a feature descriptor in the parlance of this disclosure.

According to an embodiment, it is proposed to describe a feature depending on the values in the intensity image and the depth of the feature, provided by the method described above. More specific implementations of this proposal are explained below.

According to an embodiment, the support region of the feature descriptor is scaled inversely proportional to the depth of at least one element in the intensity image being a part of the detected feature.

According to another embodiment, the descriptor coordinates of the feature descriptor are scaled inversely proportional to the depth of at least one element in the intensity image being a part of the detected feature.

Particularly, it is proposed to scale the coordinates or the support region of the feature descriptor inversely proportional to the depth of the feature. This results in the scale of the feature descriptor corresponding to a real scale and does not only improve repeatability of feature descriptor scale but also enables distinguishing similar features at different physical scales.

If the real scale should correspond to an absolute scale that could be used across different devices, an estimate of the focal length of the capturing device is needed. The scale in pixels ($S_{pixels}$) corresponding to an absolute real scale ($S_{real}$) at a certain distance ($Depth_{real}$) is then computed as $$S_{pixels} = FocalLength_{pixels} * S_{real} / Depth_{real}.$$

FIG. 10b shows a flow diagram of a method according to an embodiment of this aspect of the invention. After capturing an intensity image with a capturing device or loading an intensity image and providing a method that gives the depth of a requested pixel in step S61, features are detected in step S63 at scales defined in step S62. These scales do not have a known relation to real (physical) scales but are defined in image coordinates. For describing a feature in step S65, we incorporate the depth of the feature provided by the depth-providing method. The depth is used to scale the descriptor coordinates to correspond to a real scale, as explained above. After orientation assignment in step S66, the features are described using the descriptor scale corresponding to a real scale in step S67. Eventually, the described features are used in an application in step S68. In possible implementations of the invention, features are extracted in order to provide depth (e.g. using a stereo camera). In that case, the features can immediately be passed to step S65 and steps S62, S63 and S64 (i.e. feature extraction FE corresponding to steps S53 and S54 in FIG. 10a) do not have to be conducted (any more).

An embodiment of the method proposed in this section uses point features (i.e. keypoints or interest points) and feature descriptors for such features. Given a 2D point in an image, a scale and optionally an orientation, it computes a descriptor, which can for instance be represented by a real-valued vector based on the intensity values in the support region around a feature. Popular examples of such methods include SIFT and SURF.

To support handling scenes with strong depth variations, we propose to define multiple desired feature descriptor scales that correspond to real scales. So one possible embodiment of the invention uses different real scale support regions, where the support region is smaller at smaller depths and larger at higher depth values. For example, a support region of 50 mm×50 mm does not make sense when imaging a far away mountain, as it would cover way less than a pixel. On the other hand, a support region of 10000 mm×10000 mm might make sense for such a scene, while it is clearly unfeasible in an indoor desktop environment.

According to an embodiment as described above in section 1 and/or in this section 2, the scale is defined as a global setting and the feature descriptor does not contain at least a second parameter indicative of the scale and/or of the support region.3. Scale-invariant real-scale-aware feature description according to a further embodiment of the invention:

According to this aspect of the invention, it is proposed to define the scale of a feature descriptor based on the intensity image as done in standard approaches. The method according to this aspect comprises the steps of providing an intensity image captured by a camera, providing a method for determining a depth of at least one element in the intensity image, detecting at least one feature in the intensity image based on image intensity information provided by the intensity image, and providing a feature descriptor of the at least one detected feature with an indicator of a particular scale. The feature descriptor contains at least one first parameter based on image intensity information provided by the intensity image and at least one second parameter indicative of a combination of the scale and a depth of at least one element in the intensity image being a part of the detected feature.

For example, the second parameter is indicative of a product of the scale and the depth of at least one element in the intensity image being a part of the detected feature.

According to an embodiment, the second parameter, which optionally includes information about a focal length of the capturing device, is used as a basis for a selection step in a subsequent feature matching process in which only those features of another intensity image are considered as possible matches for the detected feature that have a feature descriptor including at least one parameter similar to the at least second parameter.

Preferably, the second parameter is invariant to a distance of a detected feature to the capturing device.

According to an embodiment, the feature descriptor contains in addition to a description of the intensity image in a support region around the feature a scalar value, for example s*d. Thereby s denotes the scale of the feature descriptor and d is the depth of the feature. While this value is ideally invariant to the distance of a feature to the capturing device, it provides a distinct description of a feature. If the depth d (or distance) of a feature doubles, the size of this feature in the intensity image, and therefore its scale s will decrease by half. It is clear to the skilled person that the focal length does not matter as long as it is constant. But in a general case, where any camera can be used, it matters. Thus, the constant would be (s*d)/f instead, where f is the focal length. This is important in order to ensure the interoperability of the data between cameras with differing focal lengths. The product of scale and depth (and optionally focal length) can for instance be used to speed up feature matching by only considering those features as possible matches that have a similar s*d value.

FIG. 10c shows a flow diagram of a method according to an embodiment of this aspect of the invention. After capturing an intensity image with a capturing device or loading an intensity image in step S71 and providing a method to gain depth samples of particular points in the intensity image, a scale space of the intensity image is created in step S73 at scales defined in step S72. In step S74, features are extracted from the scale space images. For every feature, an orientation is assigned in step S75 and a description is computed in step S76. Note, that the method so far does not differ from a regular scale-invariant method such as SIFT. In the following step S77, according to the invention the depth of the feature provided by a method provided in step S71 is incorporated. In this case, the depth forms a part of the descriptor and is multiplied with the feature scale and optionally the focal length, as explained above. Eventually, the described features are used in an application in step S78. In possible implementations of the invention, features are extracted in order to provide depth (e.g. using a stereo camera). In that case, the features can immediately be passed to step S75 and steps S72, S73 and S74 (i.e. feature extraction FE) do not have to be conducted (any more).

Figure 11:
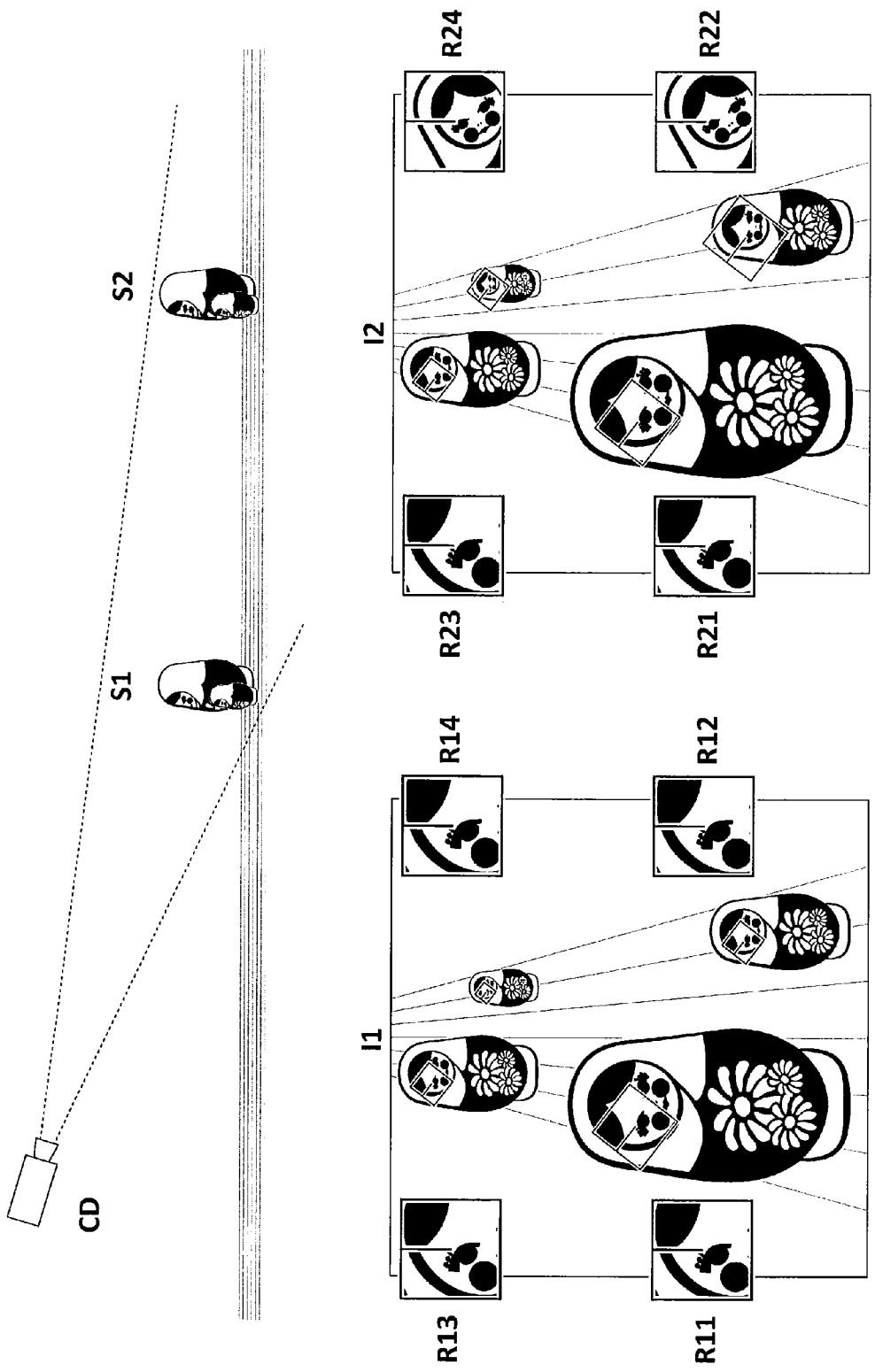
FIG. 11 illustrates an exemplary scene which compares a technique according to embodiments of the invention with standard approaches showing a setup where a capturing device captures a scene consisting of two sets of dolls.

Depiction of exemplary results: FIG. 11 compares the technique according to the above described aspects of the invention (as referred to in points 1-3) with standard approaches at a setup where a capturing device CD captures a scene consisting of two sets of dolls, S1 and S2. Each set contains two similar dolls at different scales (i.e. a tall doll and a smaller doll). The two sets S1 and S2 are located at different distances from the capturing device CD. The left figure I1 illustrates an image captured with CD. The overlaid squares indicate the support regions of a standard scale-invariant feature descriptor for features located at the right eye of every doll. The insets R11, R12, R13 and R14 show the parts of the image covered by the support regions of the individual features. As can be seen, they are all identical as a result of invariance to scale. While this enables matching features of an object at different distances e.g. R11 and R13, it does not provide discrimination between similar objects at different physical scales, e.g. R11 and R12.

In contrast, I2 shows the same captured image with support regions of four features at the right eye of each doll, scaled with a proposed method according to the invention. While the support region and therefore the descriptor is invariant to the distance of an object from the camera, e.g. R21 and R23 or R22 and R24, it differs for similar objects at different scales. For example the support region R21 and R22 clearly differ in their image content, which results in distinct feature descriptors.

According to an embodiment of the invention, for providing the reference and/or current depth samples a method for determining a depth of at least one element in the intensity image is based on an optical focus of the capturing device.

According to another embodiment of the invention, in the method for determining a depth of at least one element in the intensity image, depth samples of elements in the intensity image are generated by extracting features of the intensity image and at least one further intensity image and matching them using the epipolar geometry of a stereo-camera pair capturing the intensity image and the at least one further intensity image. In this case where the features are extracted in order to provide depth (e.g. using a stereo-camera) the extracted features can immediately be used for the feature description. For example, in a first step, two intensity images I1 and I2 are captured by a camera or loaded which may then optionally be subject to pre-processing. After a scale space or a set of discrete scales has been defined, features are detected in that scale space in I1 and/or I2 and correspondences are determined, for example using the epipolar geometry of the stereo-camera pair or scale-invariant feature descriptors for a mono-camera setup. A detected features correspondence C(F1(x,y), F2(x,y)) with Fi designating the two corresponding features and x, y designating a 2-dimensional position of the respective feature Fi is considered to describe projections of the same point in 3D space into I1 and I2 and thus, the depth, i.e. the position in 3D space of this point can be computed for example by triangulation. Before using the described features eventually in an application, the extracted features or keypoints K are described. The description contains the descriptor v, which is created from intensity data. In addition, it can make sense, depending on the application, to store their position in the image (x,y) or their 3D position (can be calculated from depth). Optionally, the scale s, orientation o and determined depth d may also be stored with respect to the keypoints. In order to employ this embodiment of the invention, it is not necessary to store the scale as part of the descriptor. For example, scale could also be defined globally to 10 mm or 1000 mm for certain depths or using a general formula dependent from the depth d, which applies to all features in the application. As described above with respect to FIGS. 10b and 10c, either a method according to an embodiment of the invention as described in above section 2 (for example, starting from S65 in FIG. 10b) or section 3 (for example, starting from S75 in FIG. 10c) may be used. In case of an embodiment according to section 3, K will also further comprise a value derived from combining s and d (and optionally the camera's focal length).

According to a further embodiment of the invention, the depth of at least one element in the intensity image is estimated using visual search algorithms to initially compare different distances.

According to an embodiment of the invention, the method may further comprise the steps of providing a measurement of a position and orientation of the capturing device in a global coordinate system, determining a pose of the capturing device from the measurement, providing a 3D model of an environment, wherein the pose is used in combination with the 3D model to compute the depth of at least one element of a feature in the intensity image, for example by means of casting a virtual ray from the capturing device center through the feature into the 3D model.

Measurements of position of the capturing device in a global coordinate system may be provided by a GPS sensor/receiver, IR or RFID triangulation, or by means of localization methods using a broadband or wireless infrastructure. Measurements of orientation of the capturing device in a global coordinate system may be provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

Possible combinations of a depth providing methods with real scale feature descriptors may be used in optical pose estimation and tracking, for example in order to create outdoor AR experiences. For example, depth is extracted using rough sensor data and an environment model. An intensity image I1 is captured by a capturing device or loaded. In addition, an initial pose of the capturing device while capturing I1 is estimated from rough sensor measurements such as GPS position and orientation sensor information. Finally, an advanced environment model including 3D data and image data (similar to Google Streetview) is provided. Image data is only necessary, if a reference model for tracking (e.g. already containing feature 3D coordinates and feature descriptors) has not been created in advance. The environment model is loaded using the assumed camera pose, i.e. the environment model is rendered from the camera viewpoint of intensity image I1. Depth information is retrieved from the environment model and used in a next step for calculating the real scale descriptors of detected features. In other words, using the depth information registered with the image I1, real scale features are extracted at a fixed scale of, for example 1 m. Because the environment model combines 3D data and image data, a reference 3D model of physical scale features with a scale of 1 m can be created (this can of course be done in advance). The results can then be used to create correspondences of features in I1 and 3D physical scale features. Using an optimization algorithm, the refined pose of I1 in the environment model's coordinate system can be calculated. The refined pose can then be used for an application, e.g. an Augmented Reality visualization of tourist data, or optionally be used to refine the pose estimation and iterate through the process, until the change in pose has gone below a defined quality threshold.

Three-Dimensional Model Generation

As explained above, the determined three-dimensional model may be determined in various forms depending on the available data and used reconstruction method. A three-dimensional model may be determined as a three-dimensional point cloud, a meshed three-dimensional point cloud, an edge-based model, a Bezier surface model, a three-dimensional CAD model, or a volumetric model using depth samples associated to a set of two-dimensional imaged points and/or additional information determined from a set of two-dimensional imaged points. The set of two-dimensional imaged points may be an intensity image.

For example, a suitable reconstruction method for determining a meshed three-dimensional point cloud may be the method of Turk. Here, also a fixed threshold for the maximal edge length per vertex-pair may be used instead of using a flexible threshold when working on a fixed volume. An alternative approach which is based on a volumetric model is described by B. Curless and M. Levoy. 1996. A volumetric method for building complex models from range images. In *Proceedings of the* 23*rd annual conference on Computer graphics and interactive techniques* (SIGGRAPH '96). ACM, New York, N.Y., USA, pp. 303-312.

According to an embodiment of the present invention, the three-dimensional model and/or current three-dimensional model further comprise additional information which is determined from the set of reference two-dimensional imaged points and/or set of current two-dimensional imaged points using the intrinsic parameters such as color, texture, and/or shading information. For example, the additional information may be determined by associating the color of at least a corresponding reference two-dimensional imaged point to the three-dimensional model (not shown in FIG. 2). When the three-dimensional model is determined as a three-dimensional point cloud or a meshed three-dimensional point cloud as depicted in FIG. 2a, the three-dimensional point cloud may be colored by means of a vertex mapping wherein the color or grey value of the corresponding pixel in the set of two-dimensional imaged points is associated to every vertex of the three-dimensional model. Or the three-dimensional model may be colored by means of a texture mapping wherein the two-dimensional position of the corresponding pixel in the set of two-dimensional imaged points is associated to every vertex of the three-dimensional model.

FIG. 5 shows the meshing and texturing results of a three-dimensional point cloud of an object captured from a certain camera viewpoint.

Exemplary Evaluation Results

The table of FIG. 7 presents exemplary results of an evaluation of the estimated camera poses for all sequences for a method according to the present invention ("proposed") as well as for several PTAM (e.g., see Klein) initializations. Mean and variance of the error in rotation and translation of the proposed method and PTAM with different initializations are depicted. Frames 0+5 were used for PTAM 05, frames 0+10 for PTAM 10 etc. The best results per sequence are highlighted in bold.

What becomes clear from the results is that in order to initialize PTAM it is necessary to carefully move the camera a certain distance to establish an initial stereo configuration. The baseline of these frames affect the scale of the map that PTAM builds (and the scale of the trajectory that PTAM estimate).

The method according to the present invention ("proposed") is always initialized on the first frame of the sequence and is able to track the full sequences. When evaluating PTAM, for all sequences, the same first frame was used and the second image of the initial stereo setup was varied from frame 1 to frame 50. For some image pairs, the initialization of PTAM did not succeed.

In contrast, thanks to the usage of metric depth maps, the proposed method estimated an identical scene scale for all four sequences. Further evaluation showed that the scale factor value needed for metric alignment of the trajectory is relatively stable around 1 and with a low variance no matter which first from the first 50 frames of each sequence is chosen.

FIG. 7 shows that PTAM's accuracy and precision depends on which image pairs are used for the initialization. There was no clear rule which frame the user should use in order to always get the best rotation and translation estimation. With some image pairs, it was even not able to initialize despite a large baseline between the frames. This is one of the disadvantage of PTAM. For example, when comparing the method according to the present invention for the first sequence initialized on frame 0, and the best result that PTAM could achieve on this sequence (using frame 0 and frame 15), the method according to the present invention still receives better translation estimation and the camera trajectory estimation is much closer to the reference ground truth trajectory than for PTAM, despite a good rotation estimation from PTAM.

Application Scenarios

An embodiment according the present invention may be used in an augmented reality-based virtual furniture trial application meant to help the typical user who needs to virtually try new furniture (e.g. a closet) in the room before buying it. The user would not only check the color and the model of the furniture but also its size. This requires correctly scaled camera pose estimation. Applying the present invention, the furniture can be placed at the desired position with the correct scale, without modifying the environment. Furthermore, due to the reconstruction of the environment the user gets a more realistic impression of the possible future look. To further assist the user, one could use a dense reconstruction for restricting the movement of the virtual furniture such that e.g. it cannot be accidentally pushed "through" a wall or in case there are moving parts like doors or drawers, it could be automatically checked whether they can be operated using their full designed range of motion.

The present invention may also be used in terms of a visual discrepancy check. This is of great use in an industrial application like prototyping. It is often required to visually compare a prototype with a produced model. Using AR allows reducing the costs of construction since there is no need for manual as-is analysis by a construction engineer. The presented example assumes a high precision of the tracking for which currently a mechanical measurement system is used best. However, for coarser discrepancy checks a dense mesh created online by the proposed method may be sufficient. Once the current desired geometry is registered to the currently observed state, its potential differences can be easily highlighted. In case there is no depth information of the current state of an object, one can use a virtual clipping plane to perform a visual discrepancy check.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method for estimating a camera motion and for determining a three-dimensional model of an environment, comprising the steps of:
   obtaining a set of reference two-dimensional imaged points captured by a camera at a first camera pose and reference depth samples associated to the set of reference two-dimensional imaged points;
   determining a three-dimensional model of the environment using the reference depth samples and intrinsic parameters of the camera;
   providing a set of current two-dimensional imaged points captured by the camera at a second camera pose and current depth samples associated to the set of current two-dimensional imaged points and determining a current three-dimensional model using the current depth samples and the intrinsic parameters;
   estimating a camera motion between the first camera pose and the second camera pose by means of an image registration method;
   determining based on the estimated camera motion a similarity measure between the three-dimensional model and the current three-dimensional model;
   in response to determining that the similarity measure meets a first condition, updating the three-dimensional model of the environment using at least one point of the current three-dimensional model; and
   in response to updating the three-dimensional model using at least one point of the current three-dimensional model, adding the set of current two-dimensional imaged points to the set of reference two-dimensional imaged points.

2. The method according to claim 1, further comprising repeating providing a set of current two-dimensional points, estimating, and determining a similarity measure, using the three-dimensional model and the set of reference two-dimensional imaged points resulting from a previous iteration of providing a set of current two-dimensional points, estimating, and determining a similarity measure.

3. The method according to claim 2, further comprising recording the similarity measure data over time and if it is determined that the similarity measure data in a defined time frame meets a second condition, the three-dimensional model is no longer updated and the current set of two-dimensional imaged points are no longer added to the reference set of two-dimensional imaged points.

4. The method according to claim 2, further comprising determining a frequency of the similarity measure meeting the first condition and if it is determined that the frequency of updates falls below a defined threshold, the three-dimensional model is no longer updated and the current set of two-dimensional imaged points are no longer added to the reference set of two-dimensional imaged points.

5. The method according to claim 1, wherein determining the similarity measure further comprises rendering the three-dimensional model into a coordinate system of the current three-dimensional model and determining the similarity measure between the three-dimensional model and the current three-dimensional model.

6. The method according to claim 1, wherein the similarity measure is indicative of an overlap between the three-dimensional model and the current three-dimensional model.

7. The method according to claim 1, further comprising determining whether an associated three-dimensional point exists in the three-dimensional model for at least one point in the current three-dimensional model.

8. The method according to claim 7, further comprising determining whether a difference between the depth of the at least one point in the current three-dimensional model and the depth of the determined associated three-dimensional point in the three-dimensional model is above a defined threshold.

9. The method according to claim 7, wherein the similarity measure is defined such that a number of points in the current three-dimensional model for which no associated three-dimensional point in the three-dimensional model is determined must exceed a certain threshold.

10. The method according to claim 7, wherein only points in the current three-dimensional model for which no associated three-dimensional point in the three-dimensional model is determined are used for updating the three-dimensional model.

11. The method according to claim 1, further comprising:
  determining, based on the estimated camera motion, a depth of a three-dimensional point in the three-dimensional model and the depth of the three-dimensional point from the current depth samples associated to the set of current two-dimensional imaged points;
  determining a refined depth of the three-dimensional point from the depth of the three-dimensional point in the three-dimensional model and the depth of the associated three-dimensional point in the current three-dimensional model; and
  updating the depth of the three-dimensional point in at least one of the current three-dimensional point cloud, and in the three-dimensional model with the determined refined depth.

12. A system for estimating a camera motion and for determining a three-dimensional model of an environment, comprising:
  a processor; and
  a memory coupled to the processor and comprising computer code which, when executed by the processor, causes the system to:
  obtain a set of reference two-dimensional imaged points captured by a camera at a first camera pose and reference depth samples associated to the set of reference two-dimensional imaged points;
  determine a three-dimensional model of the environment using the reference depth samples and intrinsic parameters of the camera;
  provide a set of current two-dimensional imaged points captured by the camera at a second camera pose and current depth samples associated to the set of current two-dimensional imaged points and determining a current three-dimensional model using the current depth samples and the intrinsic parameters;
  estimate a camera motion between the first camera pose and the second camera pose by means of an image registration method;
  determine based on the estimate of the camera motion a similarity measure between at least one three-dimensional point in the three-dimensional model and an associated three-dimensional point in the current three-dimensional model;
  in response to determining that the similarity measure meets a first condition, updating the three-dimensional model of the environment using at least one point of the current three-dimensional model; and
  in response to updating the three-dimensional model using at least one point of the current three-dimensional model, adding the set of current two-dimensional imaged points to the set of reference two-dimensional imaged points.

13. The system according to claim 12, wherein the associated three-dimensional point in the current three-dimensional model is determined based on the estimated camera motion.

14. The system according to claim 12, wherein the similarity measure is defined as a difference between a depth of the three-dimensional point in the three-dimensional model and a depth of the associated three-dimensional point in the current three-dimensional model.

15. The system according to claim 12, wherein a refined depth of the three-dimensional point is determined from the depth of the three-dimensional point in the three-dimensional model and the depth of the associated three-dimensional point in the current three-dimensional model and is used for updating the depth of the three-dimensional point in at least one of the current three-dimensional model and in the three dimensional model.

16. The system according to claim 1, wherein at least one of the current depth samples is discarded if it is determined that the depth value is above a defined threshold.

17. The system according to claim 1, wherein the image registration method is feature-based or intensity-based.

18. The system according to claim 17, wherein in the feature-based image registration method, two-dimensional image features from the set of reference two-dimensional imaged points are extracted and the camera motion is estimated by determining two-dimensional correspondences based on the extracted image features.

19. The system according to claim 1, wherein at least one of the three-dimensional model and current three-dimensional model further comprise additional information which is determined from at least one of the set of reference two-dimensional imaged points and the set of current two-dimensional imaged points using the intrinsic parameters.

20. The system according to claim 19, wherein the additional information is determined by associating the color of at least a corresponding reference two-dimensional imaged point to the three-dimensional model.

21. A non-transitory computer readable medium comprising software code sections which are adapted to
  obtain a set of reference two-dimensional imaged points captured by a camera at a first camera pose and reference depth samples associated to the set of reference two-dimensional imaged points;
  determine a three-dimensional model of the environment using the reference depth samples and intrinsic parameters of the camera;
  provide a set of current two-dimensional imaged points captured by the camera at a second camera pose and current depth samples associated to the set of current two-dimensional imaged points and determining a current three-dimensional model using the current depth samples and the intrinsic parameters;
  estimate a camera motion between the first camera pose and the second camera pose by means of an image registration method;
  determine based on the estimated camera motion a similarity measure between the three-dimensional model and the current three-dimensional model;
  in response to determining that the similarity measure meets a first condition, updating the three-dimensional model of the environment using at least one point of the current three-dimensional model; and
  in response to updating the three-dimensional model using at least one point of the current three-dimensional model, adding the set of current two-dimensional imaged points to the set of reference two-dimensional imaged points.

* * * * *